(12) United States Patent
Nemirovsky et al.

(10) Patent No.: US 9,568,367 B2
(45) Date of Patent: Feb. 14, 2017

(54) SENSING DEVICE HAVING A THERMAL ANTENNA AND A METHOD FOR SENSING ELECTROMAGNETIC RADIATION

(75) Inventors: Yael Nemirovsky, Haifa (IL); Dan Corcos, Haifa (IL); Shlomo Katz, Haifa (IL); Alexander Svetlitza, Haifa (IL); Madlena Dolgin, Haifa (IL)

(73) Assignee: TECHNION RESEARCH AND DEVELOPMENT FOUNDATION LTD., Haifa (IL)

(*) Notice: Subject to any disclaimer, the term of this patent is extended or adjusted under 35 U.S.C. 154(b) by 948 days.

(21) Appl. No.: 13/697,375

(22) PCT Filed: May 23, 2011

(86) PCT No.: PCT/IB2011/052234
§ 371 (c)(1),
(2), (4) Date: Jan. 24, 2013

(87) PCT Pub. No.: WO2011/151756
PCT Pub. Date: Dec. 8, 2011

(65) Prior Publication Data
US 2013/0142215 A1 Jun. 6, 2013

Related U.S. Application Data

(60) Provisional application No. 61/349,861, filed on May 30, 2010.

(51) Int. Cl.
*G01J 5/00* (2006.01)
*G01J 5/02* (2006.01)
(Continued)

(52) U.S. Cl.
CPC .................. *G01J 5/02* (2013.01); *G01J 5/024* (2013.01); *G01T 7/00* (2013.01); *H01Q 7/00* (2013.01);
(Continued)

(58) Field of Classification Search
CPC .......... G01J 5/02; G01J 5/024; H01Q 21/061; H01Q 7/00; H01Q 19/10; H01Q 15/0013; H01Q 9/27; G01T 7/00
See application file for complete search history.

(56) References Cited

U.S. PATENT DOCUMENTS 6,292,140 B1 * 9/2001 Osterman ............... 343/700 MS
7,095,027 B1 8/2006 Boreman et al.
(Continued)

OTHER PUBLICATIONS

Sakran, F., et. al. "Absorbing Frequency-Selective-Surface for the mm-Wave Range"; IEEE Transactions on Antennas and Propagation (vol. 56, No. 8), Aug. 2008.*
(Continued)

*Primary Examiner* — Lisa Caputo
*Assistant Examiner* — Janice M Soto
(74) *Attorney, Agent, or Firm* — Reches Patents

(57) ABSTRACT

A method and a sensing device are provided. The sensing device may include: a thermal antenna that includes a resistive material and has a cross section that has dimensions that are of an order of a micron or of a sub-micron. The thermal antenna may receive electromagnetic radiation and directly convert it to heat. The sensing device may also include a supporting element, a thermal sensor arranged to generate detection signals responsive to a temperature of a sensed area of the thermal sensor, a holding element that may support and thermally isolate the thermal antenna and the thermal sensor and thermally isolate, and a readout circuit that may process the detection signals to provide information about the electromagnetic radiation that is directly converted to heat by the thermal antenna. The thermal antenna and the thermal sensor are spatially separated from the supporting element.

36 Claims, 20 Drawing Sheets

(51) Int. Cl.

| | | |
|---|---|---|
| G01T 7/00 | (2006.01) | |
| H01Q 7/00 | (2006.01) | |
| H01Q 9/27 | (2006.01) | |
| H01Q 15/00 | (2006.01) | |
| H01Q 19/10 | (2006.01) | |
| H01Q 21/06 | (2006.01) | |

(52) U.S. Cl.
CPC ............ *H01Q 9/27* (2013.01); *H01Q 15/0013* (2013.01); *H01Q 19/10* (2013.01); *H01Q 21/061* (2013.01)

(56) References Cited

U.S. PATENT DOCUMENTS

| | | | | |
|---|---|---|---|---|
| 7,679,048 | B1* | 3/2010 | Aziz | G01J 5/02 250/252.1 |
| 7,927,908 | B2 | 4/2011 | Ouvrier-Buffet et al. | |
| 2005/0007290 | A1 | 1/2005 | Aisenbrey | |
| 2005/0224714 | A1* | 10/2005 | Akin et al. | 250/332 |
| 2006/0082512 | A1* | 4/2006 | Amyotte et al. | 343/781 P |
| 2008/0237468 | A1* | 10/2008 | Honda et al. | 250/338.4 |
| 2008/0251870 | A1* | 10/2008 | Morf et al. | 257/432 |
| 2009/0183895 | A1 | 7/2009 | Bonn | |
| 2010/0284086 | A1* | 11/2010 | Novack | H01Q 1/248 359/580 |
| 2013/0022077 | A1* | 1/2013 | Harmon | G01J 5/20 374/178 |

OTHER PUBLICATIONS

Absorbing Frequency-Selective-Surface for the mm-Wave Range; Sakran, F., Racah Inst. of Phys., Hebrew Univ. of Jerusalem, Jerusalem; Neve-Oz, Yair ; Ron, A. ; Golosovsky, Michael ; Davidov, Dan ; Frenkel, A. Antennas and Propagation, IEEE Transactions on (vol. 56), Aug. 2008.

E.S. Schwarz, B.T. Ulrich, "Antenna-coupled infrared detectors", Journal of Applied Physics, v 48(5), pp. 1870-1873, 1977.

Tien Lai Hwang, S. E. Schwarz, and D. B. Rutledge, "Microbolometers for infrared detection", Appl. Phys. Lett. 34(11), pp. 773-776, 1979.

E. N. Grossman, J. E. Sauvageau, and D. G. McDonald, "Lithographic spiral antennas at short wavelengths", Appl. Phys. Lett. vol. 59(25), pp. 3225-3227, 1991.

A. Luukanena, J. P. Pekola, "A superconducting antenna-coupled hot-spot microbolometer", Appl. Phys. Lett., vol. 82(22), pp. 3970-3972, 2003.

Morf, T. ,Weiss, J.; Kull, L.; Rothuizen, H.; Toifl, T.; Kossel, M.; Menolfi, C.; von Bueren, G.; Brunschwiler, T.; Schmatz, M. "Antenna coupled far-infrared/THz detector in CMOS", Electronics Letters, 45(25), pp. 1321-1323, 2009.

A. J. Miller, A. Luukanen, E. N. Grossman, "Micromachined antenna-coupled uncooled microbolometers for terahertz imaging arrays", Proc. of SPIE vol. 5411, pp. 18-24 (2004).

J. H. Kim, S. M. Hong, K. I. Lee, D. S. Lee, B.M. Moon, and H.I. Hwang , "The millimeter-wave detector using vanadium oxide with planar structure antenna", 2008 33rd International Conference on Infrared, Millimeter and Terahertz Waves (IRMMW-THz 2008), p. 2 pp., 2008.

F.J. Gonzalez, B. Ilic, G. D. Boreman, "Antenna-coupled microbolometers on a silicon-nitride membrane", Microwave and Optical Technology Letters, v 47, n 6, p. 546-8, Dec. 20, 2005.

J. A. Cox, R. Higashi, F. Nusseibeh, K. Newstrom-Peitso, C. Zins, R. Osiander, J. Lehtonen and E. Dodson, "Uncooled MEMS-based detector arrays for THz imaging applications", Proceedings of the SPIE—The International Society for Optical Engineering, v 7311, p. 73110R (11 pp.), 2009.

R.A. Wood, J. A. Cox, R. E. Higashi, and F. A. Nusseibeh, Honeywell International Inc., "Micromechanical Thermal Sensor", U.S. patent, Mar. 10, 2009.

Peytavit, P. Agnese, J-L. Ouvrier Buffet, A. Beguin, and F. Simoens, "Room Temperature Terahertz Microbolometers", The Joint 30th International Conference on Infrared and Millimeter Waves (IEEE Cat. No. 05EX1150), p. 257-8 vol. 1, 2005.

B. A. Munk, "Frequency Selective Surfaces: Theory and Design". New York: Wiley, 2000.

J. D. Kraus and R. J. Marhefka, "Antennas for all applications", 3rd ed. , Boston, McGraw-Hill, 2002, Ch. 18.

B. Hooberman, "Everything You Ever Wanted to Know About Frequency-Selective Surface Filters but Were Afraid to Ask", 2005.

J. D. Kraus, "Electromagnetics : with applications", 5th ed. , Boston, McGraw-Hill, 1999.

A. Itou, O. Hashimoto, H. Yokokawa, and K. Sumi, "A fundamental study of thin wave absorber using FSS technology," Electron. Commun. Jpn., vol. 87, No. 11, pp. 77-86, 2004.

A. Itou, H. Ebara, H. Nakajima, K. Wada, and O. Hashimoto, "An experimental study of wave absorber using a frequency selective surface," Microw. Opt. Technol. Lett., vol. 28, No. 5, pp. 321-323, Mar. 2001.

D. H. Kwon, D. M. Pozar, "Optimal Characteristics of an Arbitrary Receive Antenna", IEEE Transactions on Antennas and Propagation, vol. 57(12), pp. 3720-3727, 2009.

E. Socher, O. Degani and Y. Nemirovsky, "TMOS—Infrared uncooled sensor and focal plane array", U.S. Pat. No. 7,489,024 B2, 2009.

L. Gitelman, S. Stolyarova, S. Bar-Lev, Z. Gutman, Y. Ochana, and Y. Nemirovsky, "CMOS-SOI-MEMS transistor for uncooled IR Imaging", IEEE Trans. Electron Devices, vol. 56(9), pp. 935-1042, 2009.

MOSIS (http://www.mosis.com).
Ansoft HFSS (http:// www.ansoft.com).
COMSOL Multiphysics (http://www.comsol.com).
TSMC (http://www.tsmc.com).

* cited by examiner

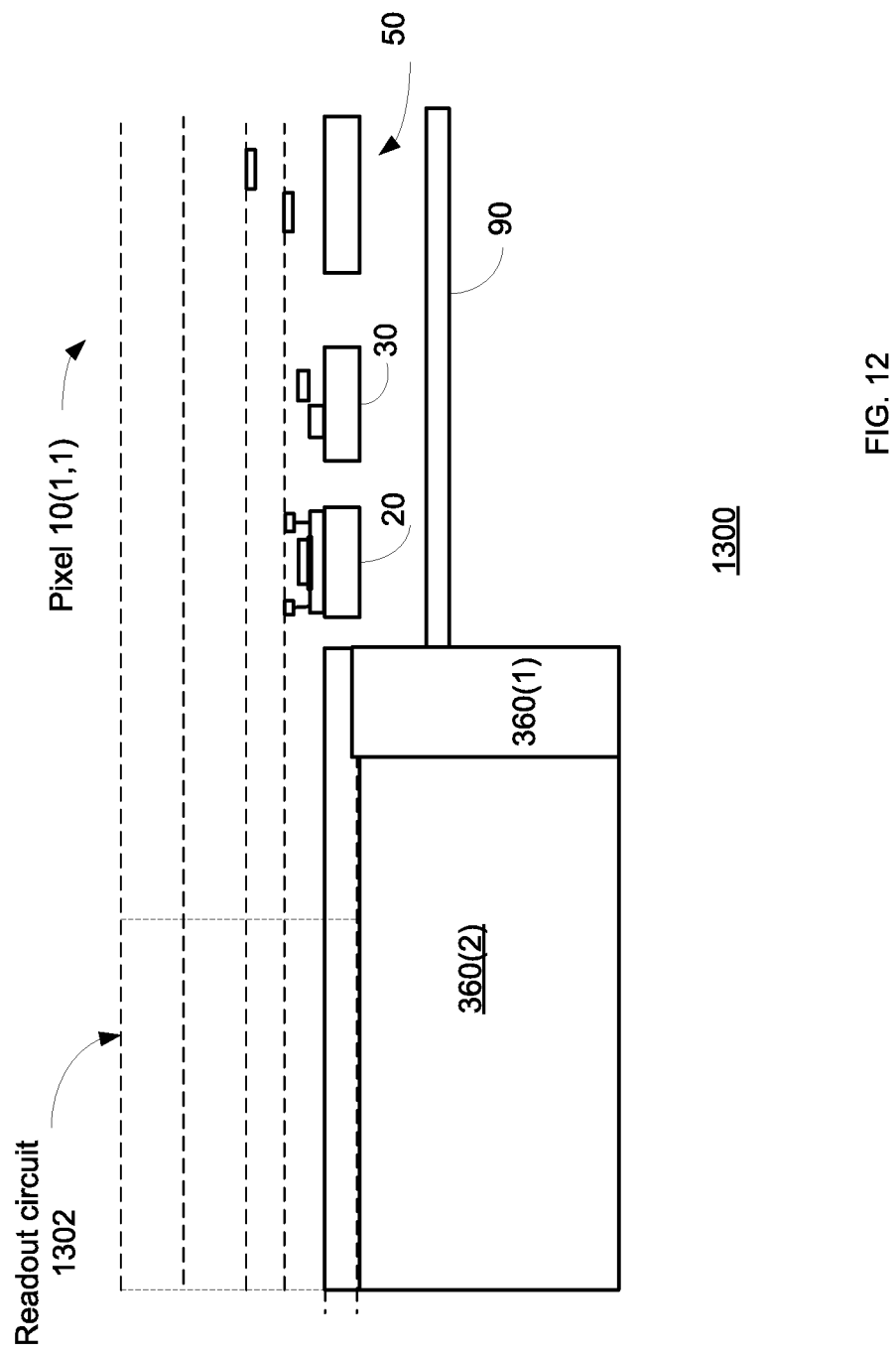

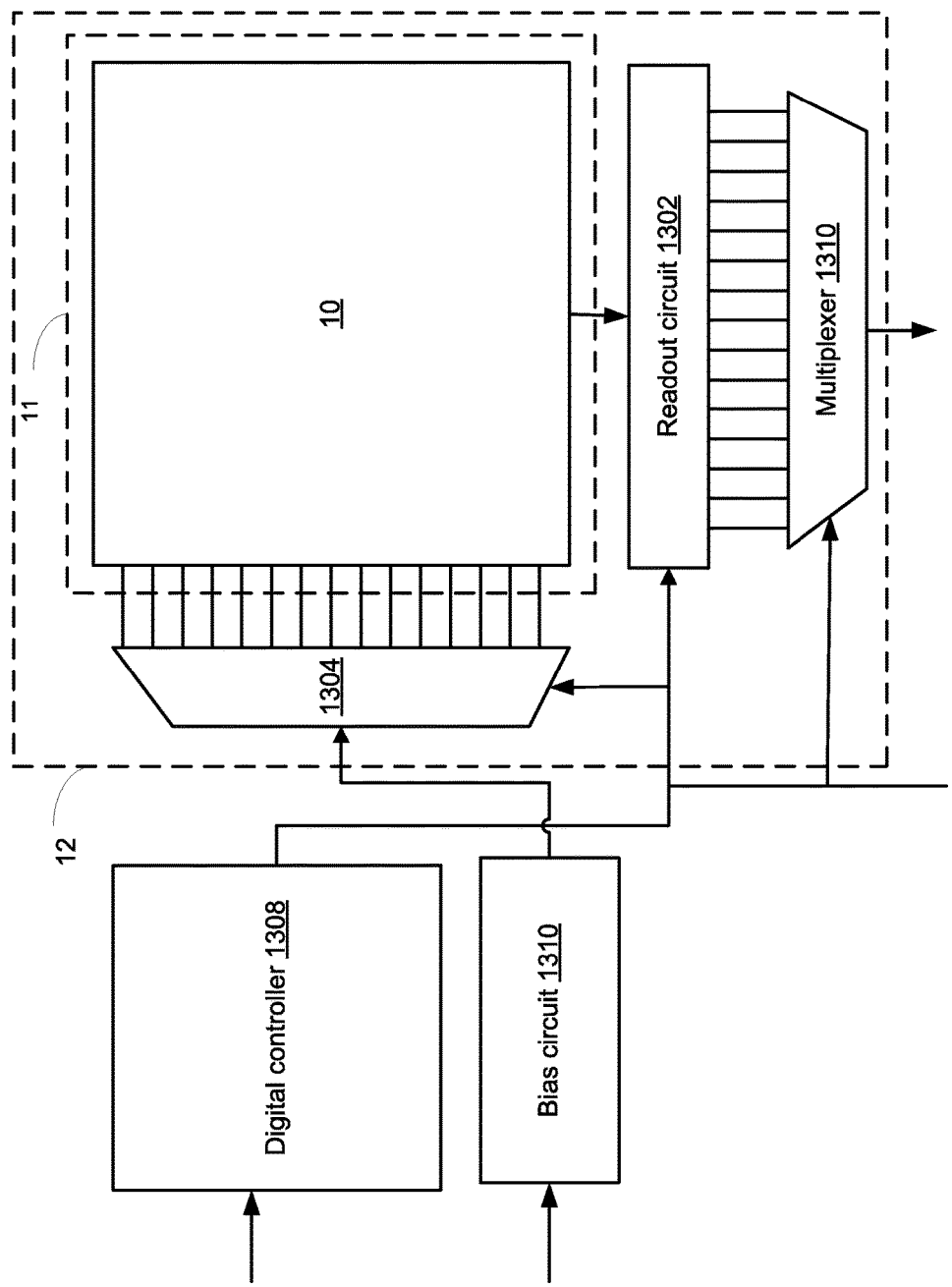

SENSING DEVICE HAVING A THERMAL ANTENNA AND A METHOD FOR SENSING ELECTROMAGNETIC RADIATION

RELATED APPLICATIONS

This application claims priority from U.S. provisional patent Ser. No. 61/349,861, filing date 30 May 2010, which is incorporated herein by reference.

BACKGROUND OF THE INVENTION

There is a growing need to provide effective sensing devices for sensing electro magnetic radiation.

The following references provide an illustration of the prior art:

[1] E. S. Schwarz, B. T. Ulrich, "Antenna-coupled infrared detectors", Journal of Applied Physics, v 48(5), pp. 1870-3, 1977.
[2] Tien Lai Hwang, S. E. Schwarz, and D. B. Rutledge, "Microbolometers for infrared detection", Appl. Phys. Lett. 34(11). pp. 773-776, 1979.
[3] E. N. Grossman, J. E. Sauvageau, and D. G. McDonald, "Lithographic spiral antennas at short wavelengths", Appl. Phys. Lett. Vol. 59(25), pp. 3225-7, 1991.
[4] A. Luukanena, J. P. Pekola, "A superconducting antenna-coupled hot-spot microbolometer", Appl. Phys. Lett., Vol. 82(22), pp. 3970-3972, 2003.
[5] Morf, T., Weiss, J.; Kull, L.; Rothuizen, H.; Toifl, T.; Kossel, M.; Menolfi, C.; von Bueren, G.; Brunschwiler, T.; Schmatz, M. "Antenna coupled far-infrared/THz detector in CMOS", Electronics Letters, 45(25), pp 1321-3, 2009.
[6] A. J. Miller, A. Luukanen, E. N. Grossman, "Micromachined antenna-coupled uncooled microbolometers for terahertz imaging arrays", Proc. of SPIE Vol. 5411, pp. 18-24 (2004).
[7] J. H. Kim, S. M. Hong, K. I. Lee, D. S. Lee, B. M. Moon, and H. I. Hwang, "The millimeter-wave detector using vanadium oxide with planar structure antenna", 2008 33rd International Conference on Infrared, Millimeter and Terahertz Waves (IRMMW-THz 2008), p 2 pp., 2008
[8] F. J. Gonzalez, B. Ilic, G. D. Boreman, "Antenna-coupled microbolometers on a silicon-nitride membrane", Microwave and Optical Technology Letters, v 47, n 6, p 546-8, 20 Dec. 2005
[9] J. A. Cox, R. Higashi, F. Nusseibeh, K. Newstrom-Peitso, C. Zins, R. Osiander, J. Lehtonen and E. Dodson, "Uncooled MEMS-based detector arrays for THz imaging applications", Proceedings of the SPIE—The International Society for Optical Engineering, v 7311, p 73110R (11 pp.), 2009.
[10] R. A. Wood, J. A. Cox, R. E. Higashi, and F. A. Nusseibeh, Honeywell International Inc., "Micromechanical Thermal Sensor", U.S. patent, Mar. 10, 2009.
[11] Peytavit, P. Agnese, J-L. Ouvrier Buffet, A. Beguin, and F. Simoens, "Room Temperature Terahertz Microbolometers", The Joint 30th International Conference on Infrared and Millimeter Waves (IEEE Cat. No. 05EX1150), p 257-8 vol. 1, 2005
[12] F. Sakran, Y. Neve-Oz, A. Ron, M. Golosovsky, D. Davidov, and A. Frenkel, "Absorbing Frequency-Selective-Surface for the mm-Wave Range", IEEE Transactions on Antennas and Propagation, vol. 56(8), pp. 2649-2655, 2008.
[13] B. A. Munk, "Frequency Selective Surfaces: Theory and Design". New York: Wiley, 2000.
[14] J. D. Kraus and R. J. Marhefka, "Antennas for all applications", 3rd ed., Boston, McGraw-Hill, 2002, Ch. 18.
[15] B. Hooberman, "Everything You Ever Wanted to Know About Frequency-Selective Surface Filters but Were Afraid to Ask", 2005
[16] J. D. Kraus, "Electromagnetics: with applications", 5th ed., Boston, McGraw-Hill, 1999.
[17] A. Itou, O. Hashimoto, H. Yokokawa, and K Sumi, "A fundamental study of thin $\lambda/4$ wave absorber using FSS technology," Electron. Commun. Jpn., vol. 87, no. 11, pp. 77-86, 2004.
[18] A. Itou, H. Ebara, H. Nakajima, K. Wada, and O. Hashimoto, "An experimental study of $\lambda/4$ wave absorber using a frequency selective surface," Microw. Opt. Technol. Lett., vol. 28, no. 5, pp. 321-323, March 2001.
[19] D. H. Kwon, D. M. Pozar, "Optimal Characteristics of an Arbitrary Receive Antenna", IEEE Transactions on Antennas and Propagation, vol. 57(12), pp. 3720-3727, 2009.
[20] E. Socher, O. Degani and Y. Nemirovsky, "TMOS—Infrared uncooled sensor and focal plane array", U.S. Pat. No. 7,489,024 B2, 2009.
[21] L. Gitelman, S. Stolyarova, S. Bar-Lev, Z. Gutman, Y. Ochana, and Y. Nemirovsky, "CMOS-SOI-MEMS transistor for uncooled IR Imaging", IEEE Trans. Electron Devices, Vol. 56(9), pp. 935-1042, 2009.
[22] MOSIS (http://www.mosis.com).
[23] Ansoft HFSS (http://www.ansoft.com).
[24] COMSOL Multiphysics (http://www.comsol.com).
[25] TSMC (http://www.tsmc.com).

SUMMARY OF THE INVENTION

According to an embodiment of the invention a sensing device is provided and may include: a thermal antenna that may include a resistive material, wherein the thermal antenna has at least one cross section that has dimensions that may be of an order of a micron or of a sub-micron, and wherein the thermal antenna is arranged to receive electromagnetic radiation and to directly convert the electromagnetic radiation to heat. The width and, additionally or alternatively the length of the cross section can be less than few microns long. The cross section can be taken across an imaginary plane that may be about normal to a longitudinal axis of the thermal antenna.

The thermal antenna is configured so that heat developed in the thermal antenna as a result of a direct conversion of the electromagnetic radiation to heat exceeds by magnitude a heat developed in the thermal antenna as a result of a flow of an electrical current developed in the thermal antenna as a result of the electromagnetic radiation.

The thermal antenna may be arranged to convert infrared radiation to heat.

The thermal antenna may be arranged to convert terahertz radiation to heat.

The thermal antenna may be arranged to convert radiation selected from Millimetric radiation and radio frequency radiation.

The sensing device may include a supporting element arranged to support a holding element; a thermal sensor arranged to generate detection signals responsive to a temperature of a sensed area of the thermal antenna; wherein the holding element may be arranged to: support the thermal antenna and the thermal sensor; and thermally isolate the thermal antenna and the thermal sensor from the supporting element; and a readout circuit that is electrically coupled to the thermal sensor, the readout circuit may be arranged to receive the detection signals and to process the detection signals to provide information about the electromagnetic radiation that is directly converted to heat by the thermal antenna; and wherein the thermal sensor and the thermal antenna may be spatially separated from the supporting element.

The thermal antenna may be arranged to act as a band pass filter for at least one frequency range out of infrared frequency range and terahertz frequency range.

The thermal antenna may be arranged to act as a band pass filter for the infrared frequency range and for the terahertz frequency range.

The thermal antenna may be bigger than the thermal sensor.

The thermal antenna may be at least four times bigger than the thermal sensor.

The spatial separation between the supporting element and each of the thermal antenna and the thermal sensor may be obtained by utilizing a Micro Electro Mechanical System (MEMS) micro-machined process.

The spatial separation between the supporting element and each of the thermal antenna and the thermal sensor may be obtained by utilizing a Nano Electro Mechanical System (NEMS) nano-machined process.

The thermal sensor may be a diode.

The thermal sensor may be a transistor.

The transistor may be a Metal Oxide Semiconductor (MOS) transistor and the MOS transistor may be arranged to operate, when generating the detection signals, at a sub-threshold region.

The transistor may be a Metal Oxide Semiconductor (MOS) transistor and the MOS transistor may be arranged to operate, when generating the detection signals, outside a sub-threshold region.

The drain and gate terminals of the MOS transistor may be connected to one interconnect; and wherein bulk and source terminals of the MOS transistor may be connected to another interconnect.

The supporting element may be formed on an oxide layer.

The supporting element may be formed on an oxide layer and the readout circuit may be a Complementary Metal Oxide Semiconductor (CMOS) readout circuit.

The supporting element may include an oxide layer.

The supporting element may include a silicon germanium layer.

The sensing device may include an electromagnetic reflector that may be spaced apart from the thermal antenna.

The sensing device may include a reflector that may be spaced apart from the thermal antenna by one fourth of an electromagnetic radiation wavelength of interest.

The sensing device may include a reflector that may be spaced apart from the thermal antenna, wherein the thermal antenna faces the reflector.

The sensing device may include a reflector that may be spaced apart from the thermal antenna and may be positioned as a certain direction in relation to the thermal antenna, wherein the thermal antenna may be directed at a direction that may be opposite to the certain direction.

The thermal antenna may be connected to the holding element at a single contact point.

The sensed area may be distant from the single contact point

The sensed area may be proximate to the single contact point.

The thermal antenna may be connected to the frame at a single contact point.

The thermal antenna may be shaped as a loop and wherein the sensed area and the single contact point may be located at opposite sides of the loop.

The sensing device may include multiple pixels; wherein each pixel may include a thermal antenna, a thermal sensor and a holding element.

The multiple pixels may be arranged to form a frequency selective surface (FSS) array.

The sensing element may include a reflector that may be spaced apart from the thermal antenna.

The multiple pixels may be coupled to the readout circuit by row lines and bit lines.

The row lines and the bit lines belong to different metal layers of the sensing device.

The row lines and the bit lines may be arranged to absorb heat generated by holding elements of the pixels.

The at least one segment of the holding element of each pixel may be proximate to a line selected of a row line and a bit line such that the line virtually short circuits the electromagnetic radiation absorbed at least in one segment of the holding element.

The row lines and the bit lines form a part of the supporting element.

The row lines and the bit lines may be supported by the supporting element.

The thermal antenna may be connected to the at least one holding element at multiple contact points.

The sensed area may be an area of the thermal antenna that may be expected to be a hottest area of the thermal antenna.

The sensed area may be proximate to an area of the thermal antenna that may be expected to be a hottest area of the thermal antenna.

The sensed area differs from an area of the thermal antenna that may be expected to be a hottest area of the thermal antenna.

The length of the thermal antenna may be not smaller than a central wavelength of a frequency range of interest. The length of the thermal antenna substantially equals a central wavelength of a frequency range of interest.

The thermal antenna has an impedance that may be electromagnetically matched to a free space electromagnetic radiation.

The thermal antenna consists of CMOS manufactured structural elements that may be manufactured by a CMOS manufacturing process, and wherein the CMOS manufactured structural elements may be sized and shaped to provide the thermal antenna with an impedance that may be electromagnetically matched to a free space electromagnetic radiation.

The thermal antenna may be arranged to absorb more thermal energy than the supporting element.

The thermal antenna may be integrated with the thermal sensor.

The thermal antenna may include multiple antenna segments; wherein adjacent antenna segments may be substantially normal to each other.

The thermal antenna may be shaped as a closed circular loop.

The thermal antenna may be shaped as an open circular loop.

The thermal antenna may be shaped as a closed non-circular loop.

The thermal antenna may be shaped as an open non-circular loop.

The thermal antenna has a spiral shape.

The thermal antenna may include multiple loops.

The thermal antenna may include multiple loops; wherein the multiple loops comprise a first loop for receiving radiation at a first frequency range and a second loop for receiving radiation at a second frequency range that differs from the first frequency range.

The thermal antenna may be shaped as a loop for receiving radiation at a first frequency range and wherein the holding element may be shaped as a second loop for receiving radiation at a second frequency range that differs from the first frequency range.

The thermal antenna may include multiple loops and wherein the thermal sensor may be located in proximity to an edge of one of the multiple loops.

The thermal sensor may be manufactured by a Complementary Metal Oxide Semiconductor (CMOS) process.

The thermal sensor may be manufactured by a bipolar process.

The thermal sensor may be manufactured by a Complementary Metal Oxide Semiconductor silicon On Oxide (CMOS-SOI) process.

The thermal sensor may include silicon germanium.

The thermal sensor may be a lateral diode.

The thermal sensor may be a bolometer.

A method for sensing electromagnetic radiation, the method may include: receiving the electromagnetic radiation by a thermal antenna, the thermal antenna may include a resistive material, wherein the thermal antenna has a cross section that has dimensions that may be of an order of a micron or of a sub-micron; and directly converting, by the thermal antenna, the received electromagnetic radiation to heat.

The method may include directly converting, by the thermal antenna, infrared radiation to heat.

The method may include directly converting, by the thermal antenna, terahertz radiation to heat.

The method may include directly converting, by the thermal antenna, radiation selected from Millimetric radiation and radio frequency radiation to heat.

The method may include: generating, by a thermal sensor, detections signals responsive to a temperature of a sensed area of the thermal antenna; wherein the thermal antenna and the thermal sensor may be supported by the holding element and may be thermally isolated and spatially separated from a supporting element by the holding element that supports the holding element; receiving the detection signals, by a readout circuit that may be electrically coupled to the thermal sensor; and processing the detection signals, by the readout circuit to provide information about the electromagnetic radiation that may be directly converted to heat by the thermal antenna.

The method may include receiving, by the thermal antenna, electromagnetic radiation of at least one frequency range out infrared frequency range and terahertz frequency range.

The method may include receiving, by the thermal antenna, electromagnetic radiation of infrared frequency range and of terahertz frequency range.

The method can be executed by any of the sensing device illustrated in the application.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 12 illustrates a cross section of a portion of a sensing device according to an embodiment of the invention; and FIG. 13 illustrates a portion of a sensing device according to an embodiment of the invention.

Figure 1A:
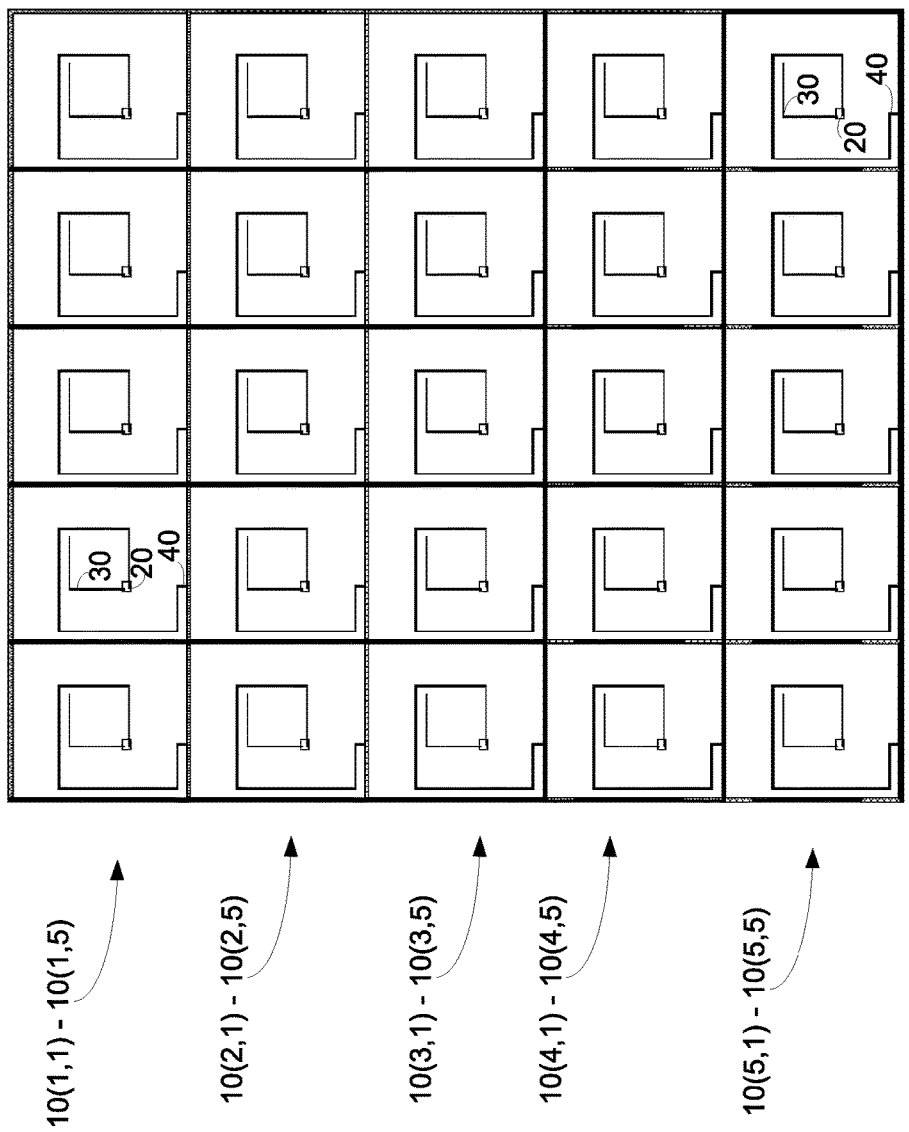
FIG. 1A illustrates a two dimensional (2D) array of pixels according to an embodiment of the invention.

It will be appreciated that for simplicity and clarity of illustration, elements shown in the Figures have not necessarily been drawn to scale. For example, the dimensions of some of the elements may be exaggerated relative to other elements for clarity. Further, where considered appropriate, reference numerals may be repeated among the Figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Various portions of the following text refer to a thermal sensor that is a MOS transistor and to a pixel that is fabricated by using a CMOS-SOI-MEMS technology. It is noted that these are merely non-limiting embodiments. Other non-limiting examples of thermal sensors may include diodes, bolometers and the like. Other non-limiting examples of fabrication processes include CMOS-SOI- NEMS technology, and the like. Any reference to micromachining should be applied mutatis mutandis to nanomachining.

There is provided a sensing device that may include a CMOS-SOI-MEMS "thermal antenna" for terahertz imaging based on thermal sensing. The term "thermal antenna" emerges from the most characteristic feature of the antenna: it absorbs the electromagnetic radiation and directly converts it to heat, in contrast to classical antennas. The temperature increase is detected by a small thermal sensor, which may be a bolometer, a forward-biased diode or a transistor operating at sub-threshold or in other region of operation. The latter, being an active device, offers some advantages in the CMOS-SOI-MEMS technology under study [20]. A tiny MOS transistor, that may be positioned on top of the antenna at a sensed area where the temperature is the highest, is actually integrated with the antenna and senses the temperature increase by the corresponding increase of its current [21]. The CMOS-SOI technology, where MEMS is applied as post-processing step, enables monolithic integration of sensors and readout to form complete Focal Plane Arrays for THz imaging. A non-limiting example of a MOS transistor fabricated by CMOS-SOI-MEMS technology is illustrated in PCT patent application WO2010076783 which is incorporated herein by reference.

The "thermal antenna" may be a part of a FSS antenna, which is based on a periodic array of resistive elements backed by a separate backside "λ/4" grounded conducting reflector. The "λ/4" absorber is founded on the Salisbury screen concept, where the perfectly conducting reflector effectively isolates the region of space behind the antenna. If the impedance of the antenna is 377 ohms, the impedance presented to the incident radiation is 377 ohms in parallel with infinite impedance—the short-circuited λ/4 line acting as infinite impedance (by drawing the analogy with a transmission line). This arrangement results in the total absorption of the radiation by the "thermal antenna" without reflection and with no transmission beyond the conducting reflector. The standing wave and energy circulation between the antenna and the conducting reflector is eventually dissipated into heat in the resistive antenna. The thermal sensor directly senses the local temperature increase where it is positioned. Accordingly, the coupling efficiency of the direct absorption described above can approach the theoretical limit of 100% (η a 100% in Eq.8).

The approach based on "thermal antenna" is distinctively different from the conventional approach of antenna coupled bolometers. In the latter approach, a receiving antenna extracts power from an incident wave and delivers it to the bolometer, which is the load. The same arrangement with a "λ/4" reflector may maximize the efficiency of the receiving antenna from 50% to 100% [19], but still, the overall coupling efficiency is limited to 50% (η a 50% in Eq.8). This is easily seen by considering an equivalent circuit of the antenna and its load. In the equivalent circuit the antenna is replaced by an equivalent generator having a voltage V and internal antenna impedance $Z_A$. The voltage V induced by the passing wave produces a current I through the load $Z_L$ given by:

$$I = \frac{V}{Z_L + Z_A}, \quad (1)$$

where I and V are RMS values.

The antenna impedance is given by:

$$Z_A = R_r + R_l + jX_A, \quad (2)$$

where $R_r$ is the antenna radiation resistance, $R_l$ is the antenna loss resistance and $X_A$ the antenna reactance.

The load impedance is given by:

$$Z_L = R_L + jX_L \quad (3)$$

Thus, the magnitude of current I is given by:

$$I = \frac{V}{\sqrt{(R_r + R_l + R_L)^2 + (X_A + X_L)^2}} \quad (4)$$

The power delivered to the load is given by $$P = I^2 R_L = \frac{V^2 R_L}{(R_r + R_l + R_L)^2 + (X_A + X_L)^2} \quad (5)$$

For a lossless antenna ($R_l=0$) and also a conjugate impedance match between antenna and load, $R_L = R_r$ and $X_A = -X_L$ and the delivered power is $$P = I^2 R_L = \frac{V^2}{(4R_L)} \quad (6)$$

while the power input is $$P = I^2(R_L - R_r) = \frac{V^2}{(2R_L)}. \quad (7)$$

Hence, the coupling efficiency is $$\frac{\text{Power delivered to bolometer}}{\text{Power input}} = 50\%$$

Thus, although regular antennas may be very efficient in the sense that the power lost as heat in the antenna structure is usually very low, the coupling efficiency of antenna coupled bolometers is always less than 50%. In contrast, the direct absorption approach, where 100% of the power is transformed into heat, is tailored to imaging applications based on thermal sensors, where 100% coupling efficiency may be achieved.

Conventional antenna coupled bolometers for thermal imaging in the infra red (IR), millimeter and Terahertz (THz) domains are by now well established [1-8]. More recently, the concept has been extended to include antenna coupled thermal sensors [9]. Conventional antennas convert electromagnetic radiation into electrical signals, e.g. currents or voltages and the energy converted to heat is regarded as loss.

It is noted that a thermal sensor may sense temperature change (for example—rise) induced in the sensing element by the absorption of the incident radiation. The temperature rise is obtained by solving the heat balance equation, modeling the sensor by a given lumped heat capacity $C_{th}$ and thermal conductivity $G_{th}$. The incremental temperature rise is approximately given by $$\Delta T(t) = \frac{\eta P_0}{G_{th}}(1 - e^{-t/\tau}) \qquad (8)$$

where the time constant r is proportional to $C_{th}/G_{th}$, $\eta$ is the coupling efficiency and $P_0$ is the incident power.

It is easily seen that in order to increase response, $G_{th}$ should be low. Accordingly, in order to reduce the time constant, $C_{th}$ should also be reduced. As a result, the size of the temperature sensing device must often be much smaller than the wavelength. In this case, an antenna must be used to capture radiation which would otherwise bypass the small sensor. In antenna-coupled devices, the thermal sensing element can be made much smaller than the detected wavelength, resulting in a much smaller heat capacity, thus allowing for smaller $G_{th}$ and better noise equivalent power (NEP). Hence the successful emergence of antenna coupled bolometers, in particular for the longer wavelengths of terahertz and millimeter waves.

Conventional antenna-coupled micro-bolometers consist of a lithographic antenna, coupled electrically to a thermally sensitive element. Incident electromagnetic radiation induces a time varying current in the antenna, which is dissipated in an impedance-matched bolometer element acting as the antenna termination.

By applying micromachining techniques to the thermal sensor and to the antenna, the thermal mass as well as the thermal conductivity, are further reduced. Still, in conventional antenna coupled bolometers, the sensor and the antenna are not thermally isolated, thus the thermal mass of the antenna and the thermal mass of the sensor are added, resulting in large thermal time constants. In order to solve this problem, a capacitive coupled antenna bolometer has been proposed, where the antenna and the thermal sensor are physically separated. The electrical link between the antenna and the sensor is made by a coupling capacitor [9, 10, and 11].

In contrast to the conventional antenna discussed above, a FSS (Frequency Selective Surface) antenna, which directly absorbs the radiation and converts it to heat, has been proposed [12]. FSS (Frequency Selective Surface) filters consist of periodic metal structures, often deposited on an insulating substrate, and are typically used to filter electromagnetic (EM) radiation. FSS filters are applicable to a wide range of EM frequencies, but the shape and dimensions of the patterned grid must be tailored to the frequency band of interest [13-15]. Application of FSS antennas to imaging comes naturally, since the 2D imager pixel array provides the periodicity that is essential for the FSS antennas.

The most common FSS is based on a periodic array of resistive elements backed by a separate backside "λ/4" grounded conducting reflector. The "λ/4" absorber is based on the Salisbury screen concept [16-18], which functions on the principle of matching impedances. Because the conducting ground plane is separated from the imager 2D array die by a distance of λ/4, where λ is the wavelength of the incident radiation, the zero ohm impedance of the ground plane is transformed to an open circuit at the FSS array. When a normally incident plane wave arrives at the imager die, it is absorbed with very high coupling efficiency $\eta \rightarrow 100\%$, provided the impedance of the FSS antenna matches the impedance of arriving plane wave. Hence, minimal reflection (and, correspondingly, maximal absorption) is obtained when the resistance of the resistive layer of the FSS antenna is equal to the impedance of free space, namely ~377 ohms.

The electrons of resistive FSS elements interact with the EM radiation and absorb its energy. This energy in converted into kinetic energy, causing the electrons to be moving in thermal agitation. Hence, when applied to optical imaging, we refer to these elements as thermal antennas. Thus, we refer to thermal sensors coupled to thermal antennas as direct absorbers. By placing a thermal sensor on the hottest point of such thermal antennas, a highly efficient coupling between the EM radiation and the thermal sensor may be achieved, resulting in highly sensitive thermal sensing. This is in contrast to conventional antenna coupled bolometers (where bolometers may be replaced by any thermal sensor), where the EM radiation induces current in the antenna and this current heats a separate thermal sensor. The efficiency of the antenna without a grounded back reflector is limited to 50% [19]. However, even with a reflector, the coupling efficiency of a thermal sensor having the micro-antennas impedance matched to the detector is limited to less than $\eta=100\%$ [9]. Furthermore, since a practical antenna is never lossless, part of the EM radiation is converted into heat inside the antenna rather than the sensor. This loss is present in the capacitive coupling approach described in [10, 11].

The direct absorbing thermal antennas have therefore a clear advantage in thermal imaging applications based on thermal sensors. The thermal sensors may be much smaller than the thermal antenna structure and preferably should be placed on the hottest point of the antenna. However, when considering practical designs, the challenge of reducing the thermal capacity as well as the thermal conductivity of the sensor still remains.

There is provided a sensing device and a method that may be based on CMOS-SOI-MEMS technology (or any other manufacturing technology), where the thermal antennas and the thermal sensor may be (but is not limited to) a transistor operating at subthreshold, dubbed as TeraMOS, that may be designed in CMOS-SOI technology [20-21]. By applying post-processing NEMS/MEMS technology, micro-machined suspended and thermally insulated thermal antennas integrated with the suspended thermal sensors are obtained, thus achieving low thermal conductivity as well as low thermal mass.

Using CMOS-SOI-MEMS technology is very promising because it is the enabling technology for monolithic FPAs (Focal Plane Arrays) for THz imaging: the readout may be designed in the CMOS-SOI wafer and this readout is directly integrated with the sensor array. Thus, this approach appears to be promising for the implementation of high performance as well as low cost THz imagers.

There may be provided several non-limiting examples of pixels and of an array of pixels An embodiment of a periodic 2D array 10 of five by five pixels 10(1, 1)-10(5, 5) is shown in FIG. 1A. For convenience of explanation a pixel of array 10 will be denoted 10(i,j), wherein index i counts the rows and index j counts the columns of the array 10. Thus pixel (1,1) is the upper and left most pixel of array 10.

It is noted that the number of pixels per array as well as the shape of the array 10 and the shape of the pixels can change without departing from the spirit of the invention. The 2D array can include much more pixels.

The array 10 may provide the periodic structure required for the FSS antennas. The thermal sensor 20 of each pixel 10(i, j) is integrated on the thermal antenna 30. For simplicity of explanation only the thermal sensor 20, the thermal antenna 30 and the holding element 40 of two pixels of the array 10 are denoted in FIG. 1A.

The thermal sensor 20 may operate in a diode-like configuration, which requires two interconnects: one to bias the source (shorted to the bulk) and the other to bias the gate (shorted to the drain).

Each pixel 10(i, j) of the array 10 includes a thermal antenna 30, a thermal sensor 20, a holding element 40 and a supporting element such as a frame 50. The frame 50 may support (or may include) bit lines and row lines that electrically connect the thermal detectors of each pixel to a readout circuit (not shown).

Figure 1B:
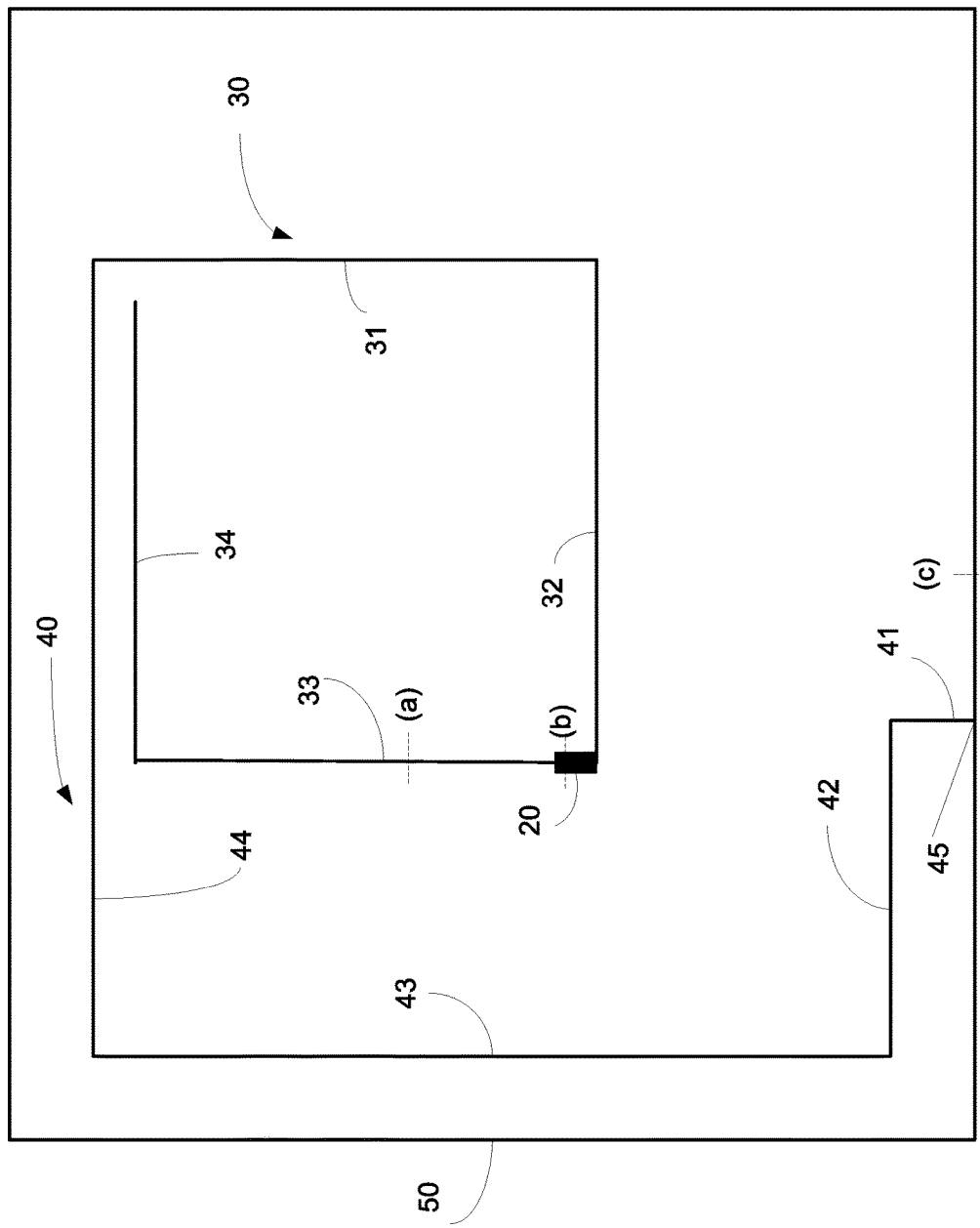
FIG. 1B illustrates a thermal sensor and a spiral thermal antenna according to an embodiment of the invention.

FIG. 1B illustrates a thermal sensor 20 and spiral thermal antenna 30 according to an embodiment of the invention. The thermal sensor 20 is positioned on a corner of the thermal antenna 30. The holding element 40 includes multiple straight segments 41-44 that are perpendicular to each other. Segments 41, 42 and 43 are very close to the frame 50 (and to the bit line and row lines included in the frame) so that these lines are virtually, in the electromagnetic sense, short circuited by the lines of frame 50 and do not absorb radiation; thus all the impinging electromagnetic radiation is directed to the thermal antenna.

The thermal antenna is shaped as a non-circular open loop and has four antenna segments 31-34 that are perpendicular to each other. The thermal sensor is positioned at a corner formed between antenna segments 32 and 33. It can be located at any other location along the thermal antenna 30. The thermal sensor 20 senses the temperature of the antenna portion that it occupies. The sensed area can be a small fraction or a larger fraction of the thermal antenna—depending upon the heat conductivity of the thermal antenna. According to an embodiment of the invention the temperature across the entire thermal antenna 30 depends on the location of the maximum of the electromagnetic field, hence on the impinging wave polarization; the sensed temperature depends as well on the distance from the frame 50 on a path along the thermal antenna 30 and holding element 40. It is beneficial to locate the thermal sensor 20 so that it senses the hottest area of the thermal antenna—so that the sensed area is the hottest area of the thermal antenna or at least overlaps the hottest area of the thermal antenna—but this is not necessarily so. It is evident that the frame 50 supports the holding arm 40, the thermal antenna 30 and the thermal sensor 20.

Figure 2A:
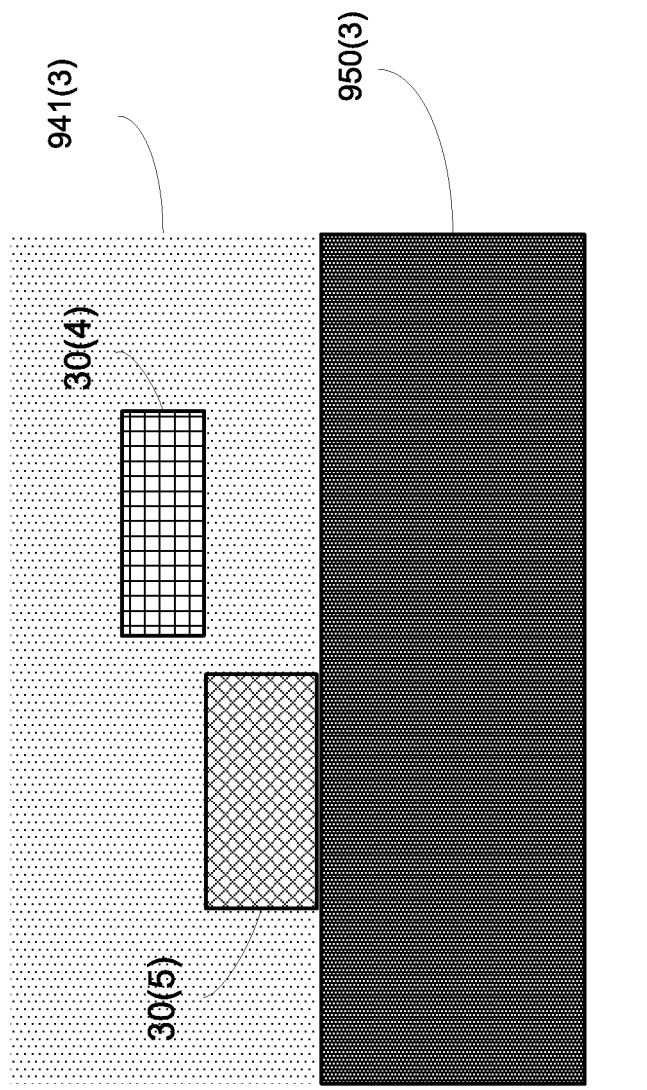
FIGS. 2A-2C are cross sectional vies of portions of a pixel according to an embodiment of the invention.
Figure 2B:
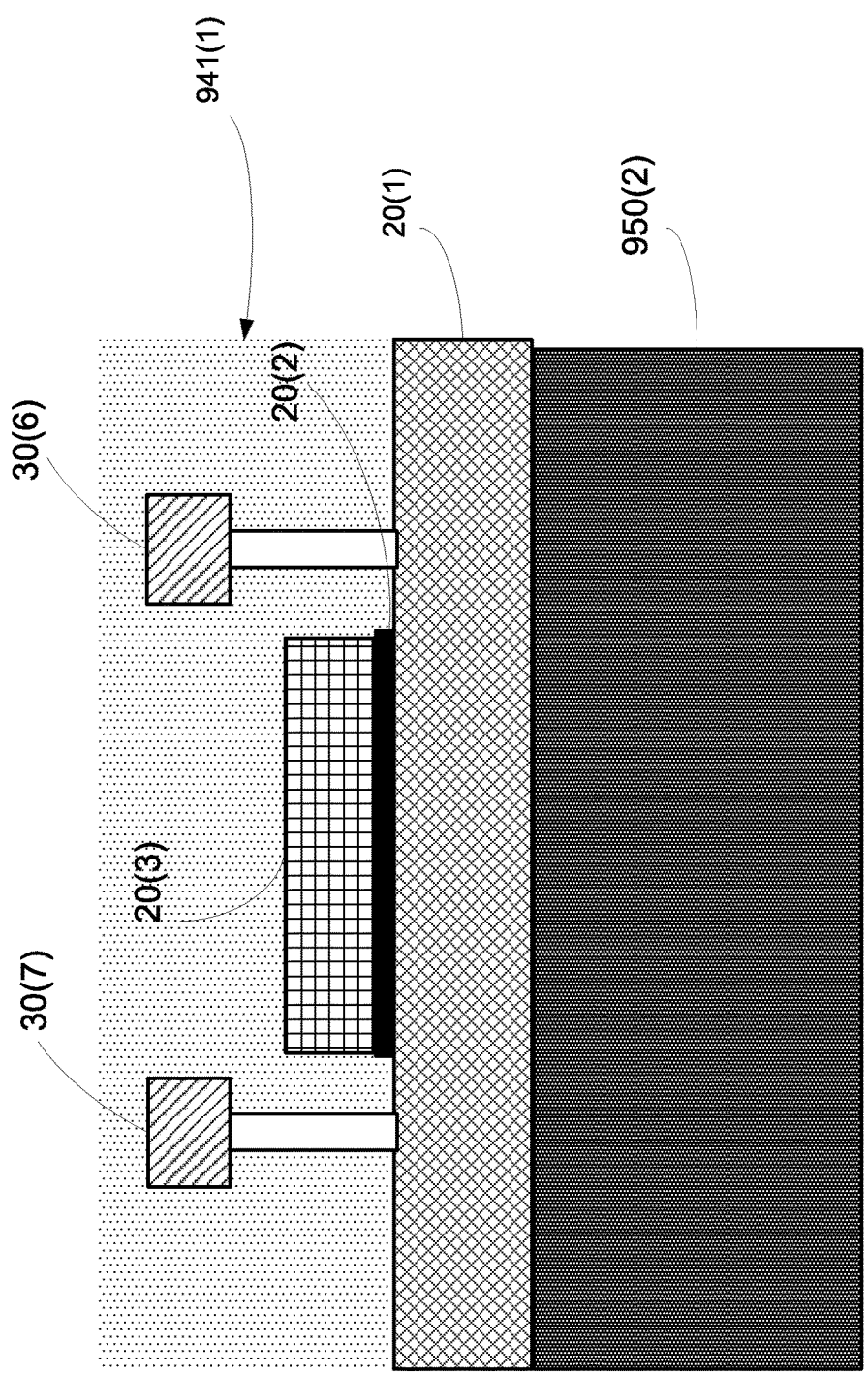
Figure 2C:
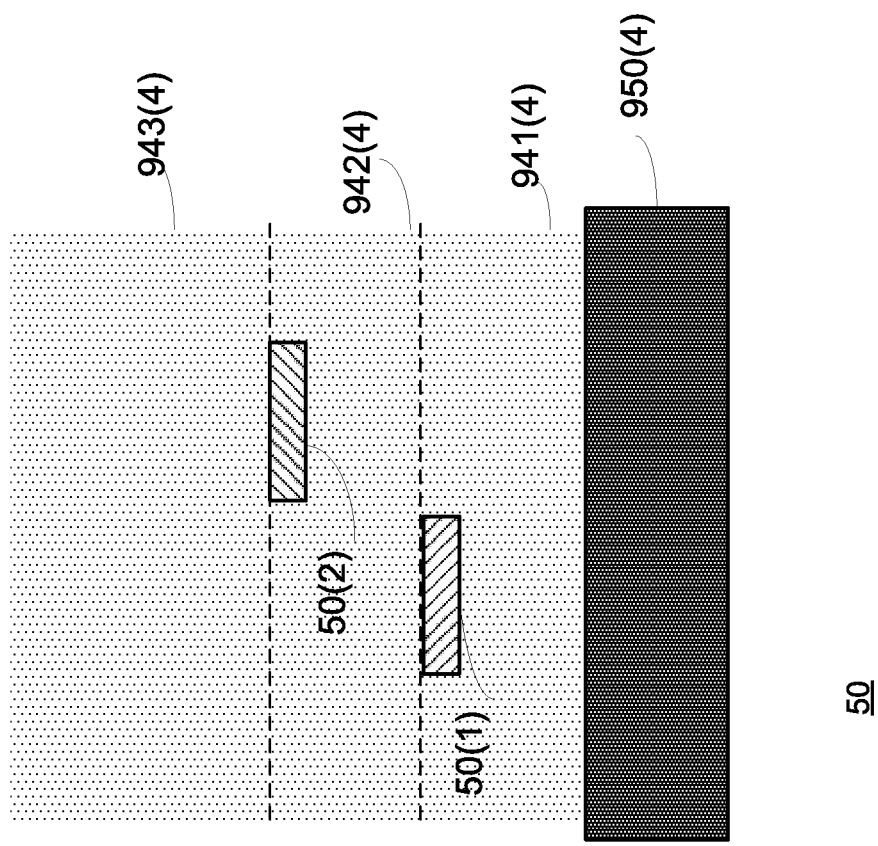

FIG. 1B also illustrates three locations denoted (a), (b) and (c). Point (a) in positioned along antenna segment 33. Point (b) is positioned on the thermal sensor 20. Point (c) is positioned along frame 50. FIG. 2A illustrates a cross sectional view of the thermal antenna 30 taken at point (a). FIG. 2B illustrates a cross sectional view of the thermal sensor 20 integrated with the thermal antenna 30 taken at point (b). FIG. 2C illustrates a cross sectional view of the frame 50 taken at point (c).

FIG. 2A illustrates a cross sectional view of the thermal antenna 30 according to an embodiment of the invention. The cross sectional view illustrates a buried oxide layer BOX 950(3) that is located beneath a first inter-level dielectric (ILD) layer 941(3). The first ILD layer 941(3) includes two conductors (that may have a relatively low conductivity) 30(4) and 30(5) that convey electrical signals between the thermal sensor 20 and bit (or row) lines and of frame 50. FIG. 2A illustrates these two conductors as made of poly silicon (30(4)) and active silicon (30(5)) but other materials can be used.

Non-limiting dimensions of the cross section are: the thermal antenna 30 is 1400 nm wide and 1655 nm high. The height of the buried oxide layer 950(3) is 1000 nm and the height of the first ILD layer 941(3) is 655 nm. The height of a first conductor 30(5) is 145 nm and its width is 220 nm. It is located 460 nm from the left side of the thermal antenna 30. The second conductor 30(4) is located 147 nm [a 2.2 nm gate oxide is omitted for simplicity] above the buried oxide layer 950. The height of the second conductor 30(4) is 170 nm and its width is 180 nm. It is located 460 nm from the right side of the thermal antenna 30 and 80 nm to the right of the first conductor 30(5).

FIG. 2B illustrates a cross sectional view of the thermal sensor 20 and of a portion of the thermal antenna 30 according to an embodiment of the invention. This cross sectional view illustrates the buried oxide layer 950(2) that is located beneath the active silicon 20(1) and first inter-level dielectric (ILD) layer 941(2)—both forming an integral part of the thermal antenna 30.

The thermal sensor 20 is supported by the buried oxide layer 950(2) and is surrounded by the first ILD layer 941(2).

The thermal sensor 20 of FIG. 2B is a MOS transistor that includes three layers 20(1)-20(3)—a lower layer 20(1) made of active silicon, an intermediate layer gate insulator 20(2) and a gate 20(3) made of poly silicon. It is noted that other materials and other configurations of the thermal layer may be provided without departing from the spirit of the invention. FIG. 2B also illustrates two conducting interconnects 30(7) and 30(6) that may be connected to the low layer 20(1). Non-limiting dimensions of the cross section are: the cross section is 2300 nm wide and 2385 nm high. The height of the buried oxide layer 950(2) is 1000 nm and the height of the first ILD layer 941(2) is 655 nm. The lower layer 20(1) is 1300 nm wide and 145 nm high it is located 500 nm from each side of the first ILD layer 941(2). The intermediate layer 20(2) is 2.2 nm high and the gate 20(3) is 170 nm high.

As can be seen from FIGS. 2A and 2B—the first conductor 30(5) is positioned to contact the lower layer 20(1) and the second conductor 30(4) is positioned to contact the gate 20(3).

FIG. 2C illustrates a cross sectional view of the frame 50 according to an embodiment of the invention.

Frame 50 includes a buried oxide layer 950(4), a first ILD layer 941(4), a second ILD layer 942(4), and a third ILD layer 943(4).

FIG. 2C illustrates the frame 50 as including two conductors 50(1) and 50(2) that form a row line. These two conductors 50(1) and 50(2) are positioned to contact the first and second conductors 30(5) and 30(4) that pass through the thermal antenna 30 and through the holding element 40 by stacked contact and via elements, not shown in this figure.

A first conductor 50(1) is located within the first ILD layer 941(4) while the second conductor 50(2) is located within the second ILD layer 942(4).

It is noted that the conductors of a bit line can be located at different heights—within different layers of the frame such as to be spatially separated from the conductors of the row line.

It is noted that conductors of row lines can be located at the same height as those of the bit lines or at different heights.

Non-limiting dimensions of the cross section of the frame are: the cross section is 5000 nm wide and 10850 nm high. The height of the buried oxide layer 950(4) is 1000 nm. The height of the first ILD layer 941(4) is 985 nm. The height of the second ILD layer 942(4) is 1080 nm. The height of the third ILD layer 943(4) is 4100 nm. The height of the first conductor 50(1) is 330 nano-meters (nm), the width of the first conductor 50(1) is 1300 nm. It is located at the top of the first ILD layer 941(4) and 1000 nm from the left side of the first ILD layer 941(4).

The height of the second conductor 50(2) is 480 nm, the width of the second conductor 50(2) is 1300 nm. It is located at the top of the second ILD layer 942(4) and 1000 nm from the right side of the second ILD layer 942(4).

FIGS. 3A-3D illustrate cross sections of a pixel during different manufacturing stages of a CMOS-SOI-MEMS manufacturing process, according to an embodiment of the invention.

Figure 3A:
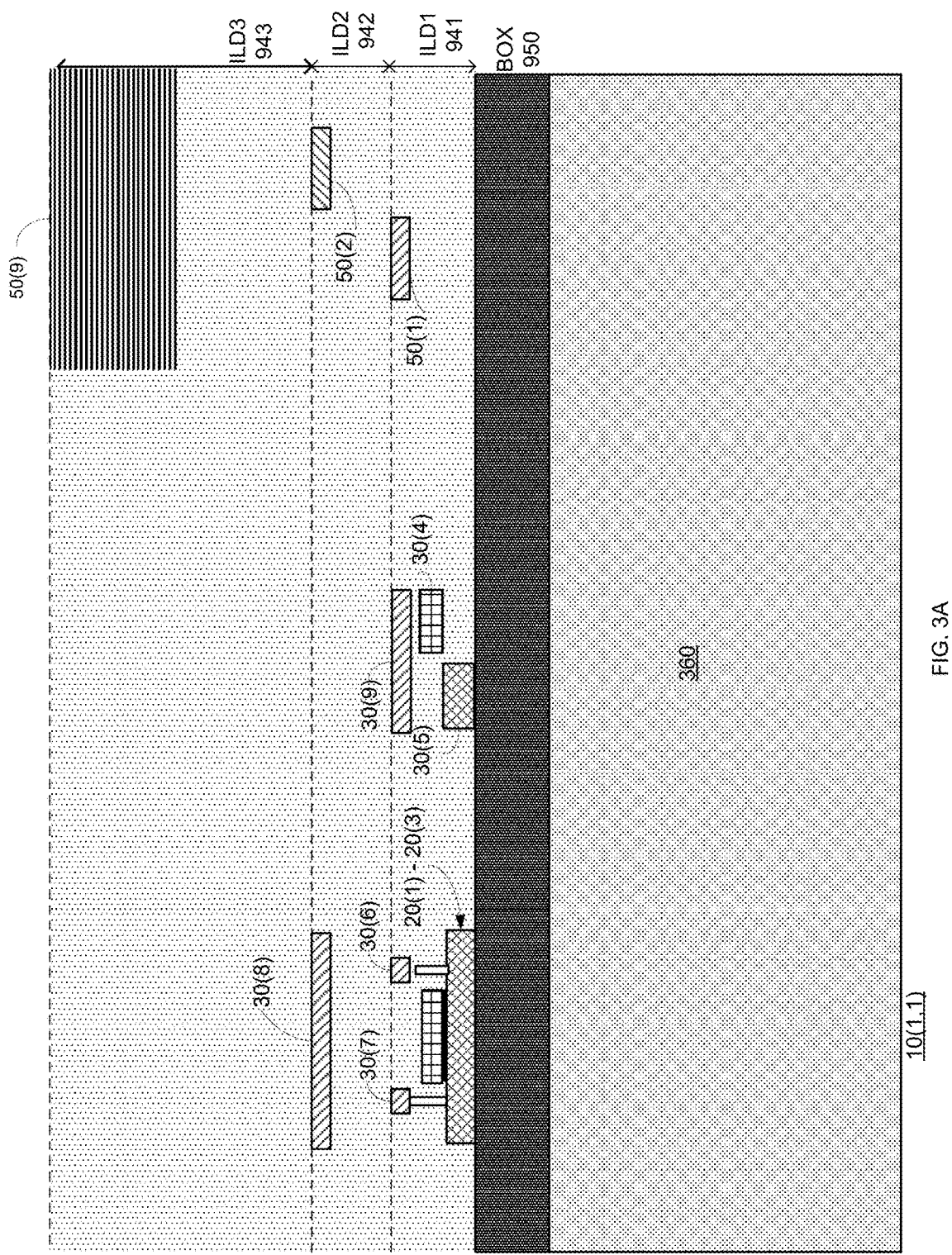
FIGS. 3A-3D include multiple cross sectional views of a pixel during different stages of a manufacturing process according to an embodiment of the invention.
Figure 3B:
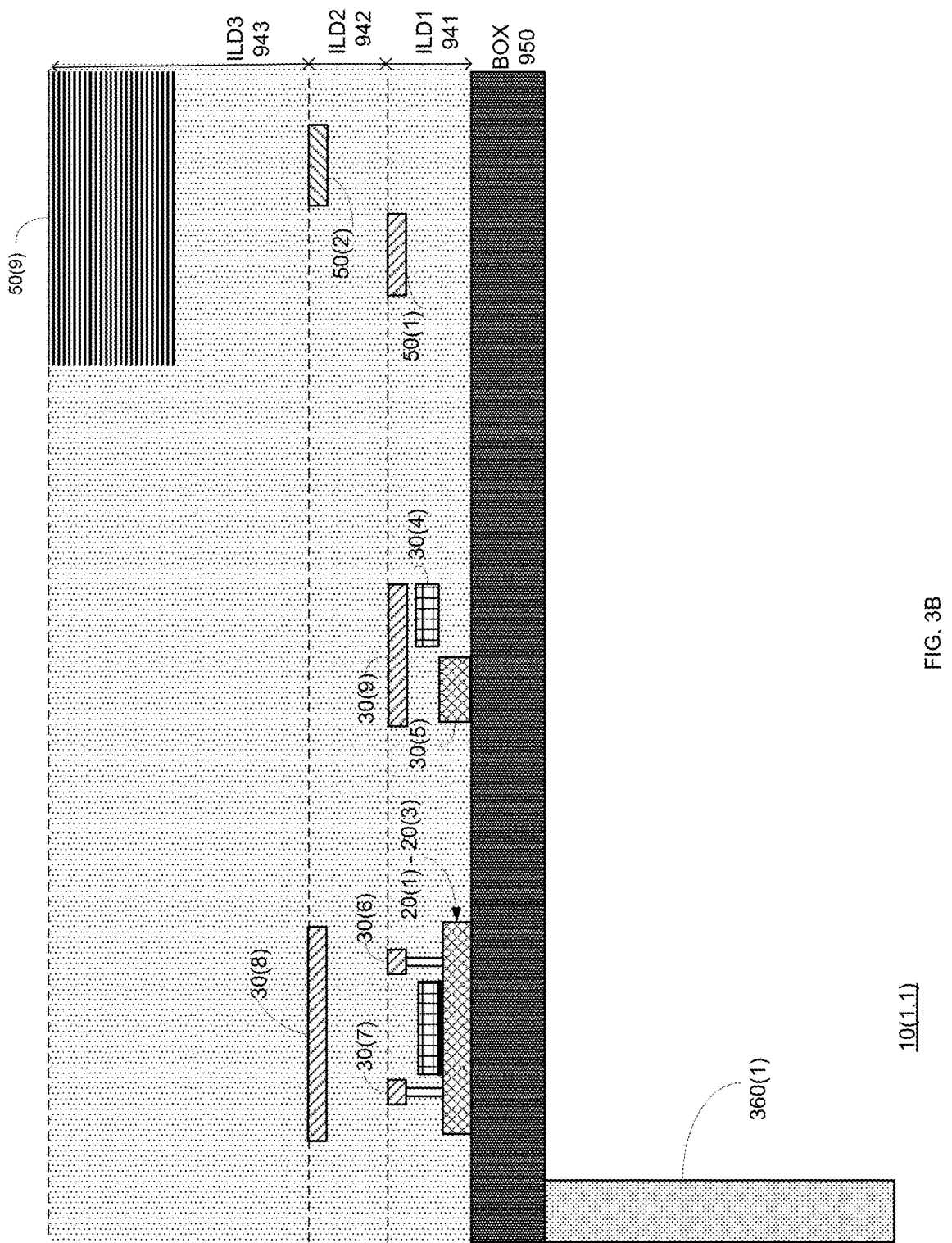
Figure 3C:
Figure 3D:
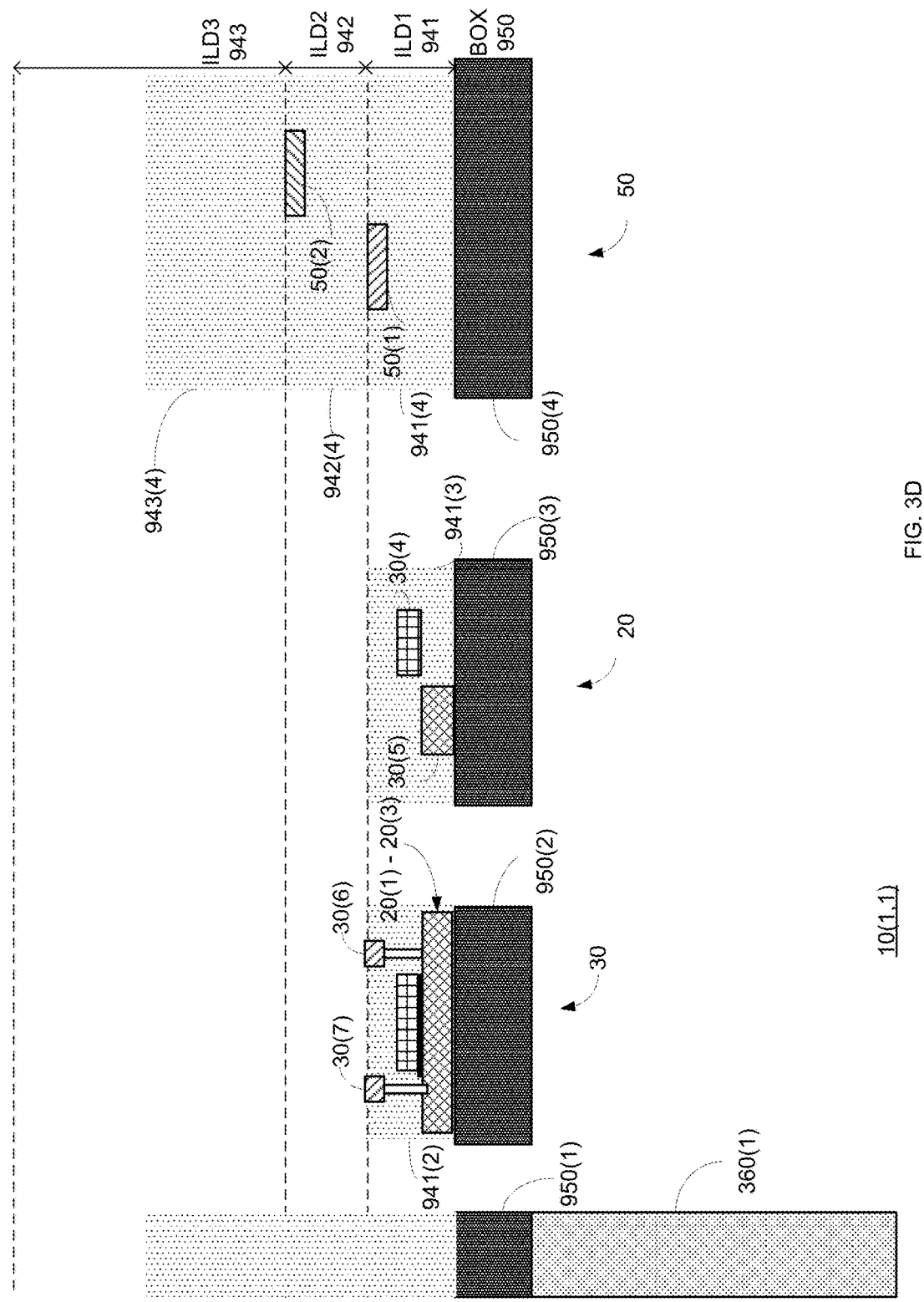

FIG. 3A illustrates a cross section of a pixel after a completion of a CMOS-SOI manufacturing process. FIG. 3B illustrates a cross section of a pixel after a completion of a back-side DRIE etching process of a silicon handle. FIG. 3C illustrates a cross section of a pixel after a completion of a front-side RIE etching of the inter-level dielectrics. FIG. 3D illustrates a cross section of a pixel after a completion of a removal of the metal masks that are used as etch stoppers during the front-side RIE etching process.

FIGS. 3A and 3B illustrate a silicon handle 360 (FIG. 3A) that is etched by back-side DRIE process to form an aperture below the buried oxide (BOX) 950 (FIG. 3B). FIG. 3C illustrates an outcome of a reactive ion etching from the front side while using metal elements (manufactured by the CMOS-SOI process) such as metal 2 element 30(8), metal 1 element 30(9), and metal 3 element 50(9) as RIE masks.

In order to exhibit the outcome of the Reactive Ion Etching the different portions of various layers were numbered in FIG. 3C by different numbers.

For example, the BOX layer 950 of FIG. 3A was etched during the RIE to provide multiple separate BOX layers:
a. 950(1)—above the silicon handle 360(1).
b. 950(2)—adjacent to (or part of) the thermal sensor 20.
c. 950(3)—adjacent to (or part of) the thermal antenna 30.
d. 950(4)—adjacent to (or part of) the frame 50.

Yet for another example, each of the ILD layers—ILD1 941, ILD2 942 and ILD3 943 was etched during the RIE to provide multiple separate layers:
a. 941(1), 942(1) and 943(1)—above the silicon handle 360(1).
b. 941(2)—partially surrounding the thermal sensor 20.
c. 941(3)—partially surrounding the thermal antenna 30.
d. 941(4), 942(4), 943(4)—part of the frame 50.

The manufacturing process may include:
a. Deep Reactive Ion Etch (DRIE) anisotropic bulk micromachining that may use SiO2 and Photoresist masks, to remove the silicon wafer portion 360(1) while the buried oxide 950 serves as etch stop.
b. Reactive Ion Etching (RIE) from the front side to fully release the thermal antenna 30, the thermal sensor 20 and the holding element 40 from the inter-level dielectric layer material that are connected between these elements. This stage may use metal elements (manufactured by the CMOS-SOI process) such as metal 2 element 30(8), metal 1 element 30(9), and metal 3 element 50(9) as RIE masks.
c. Removal either by dry or wet etching of the RIE masking metals such as metal 2 element 30(8), metal 1 element 30(9), and metal 3 element 50(9). Dry etching is based on chlorine plasma. These elements can be made from aluminum, which is not etched by the fluorine plasma of the RIE process. In addition, metal 1 elements may include adhesion/barrier under layers of titanium and titanium nitride. More advanced CMOS-SOI processes may incorporate copper for Metal 1 layer. Since copper metallization is also unaffected by the RIE plasma (which does not include chlorine), the concept of FIGS. 3A-3D may be applied successfully to the more advanced processes as well.

Thus, the above describes the fabrication process based on the metallization layers provided by a specific foundry. A different foundry may provide different metallization layers and modifications may be required.

The use of the built-in masks for each of the mentioned above RIE masks enables the alignment accuracy and resolution provided by the CMOS process, and significantly reduces the fabrication cost. In the last stage, one etches the aluminum or copper masks, namely metal 2 element 30(8), metal 1 element 30(9), and metal 3 element 50(9), either by dry or wet etching. Dry etching requires the use of chlorine plasma. It is noted that even after the RIE etch some metal elements remain (for example—conductors 30(6) and 30(7) some of which may provide the bonding pads, which are protected during the last etch by a low cost, low accuracy soft (photoresist) mask.

It is noted that the detachment of the thermal sensor 20 may not affect the electrical characteristics of the thermal sensor 20.

According to an embodiment of the invention the vicinity of the pixels is vacuumed and the pixels can be cooled by a cooling element (not shown) to a low temperature such as but not limited to 77K. Any commercially available infrared pixel array cooler can be used. According to an embodiment of the invention the array of pixels can be integrated on the cold finger of the dewar while all the drivers and supporting electronics are mounted on a PC board which is positioned on the case of the cooler. Thus, a compact design and system is achieved, corresponding to the well-established packaging of IRFPAS.

Referring back to FIG. 2A-2C—they illustrate cross sections manufactured by a CMOS-SOI-MEMS process. It is assumed that the CMOS-SOI technology is a commercially available one provided for example by [25]. The modeled electromagnetic and thermal performance of the designs under study is reported below The EM coupling efficiency is estimated by Ansoft HFSS [23] simulations while the thermal behavior is solved analytically as well as by FEM COMSOL simulations [24].

Fabrication Technology of Thermal Antenna and Thermal Sensor

Referring back to FIGS. 2A-2C FIGS. 3A-3D—they illustrate cross sections manufactured by a CMOS—SOI-MEMS or NEMS manufacturing process. It is assumed that the CMOS-SOI technology is a commercially available one provided by [22, 25]. A non-limiting example of a CMOS-SOI-MEMS process is illustrated in PCT patent application publication WO2010076783 which is incorporated herein by reference.

CMOS (Complementary Metal Oxide Semiconductor) has been exhibiting over four decades a continuous exponential improvement in performance and device size reduction, and is currently established as the most matured microelectronics technology. More recently, CMOS-SOI (silicon on Insulator) has been emerging as a leading technology in a wide range of applications including RF, low power and sensors. CMOS-SOI technology is nowadays offered commercially by advanced companies [22, 25].

NEMS/MEMS-Nano or Micro Electro Mechanical Systems is a younger technology, which enables the formation of 3D nano structures with very small thermal mass and very low thermal conductivity. These features are essential for high performance thermal sensors. By applying NEMS/MEMS as post processing, CMOS-SOI-MEMS or NEMS is currently recognized as an emerging technology for "system-on-chip". According to this approach, monolithic sensing systems are fabricated on a die: the readout circuitry is realized on the device layer of the CMOS-SOI, while the sensors are micro or nano machined by removing the silicon handle and the device layer surrounding them.

The buried oxide of CMOS-SOI is a natural etch-stop for the front- and back-side etching of the silicon device layer and the handle substrate, respectively, and thus complete systems on chip can be designed, integrating sensors and readout circuitry on the same die.

Design Considerations of Thermal Antenna and Thermal Sensor

Figure 4:
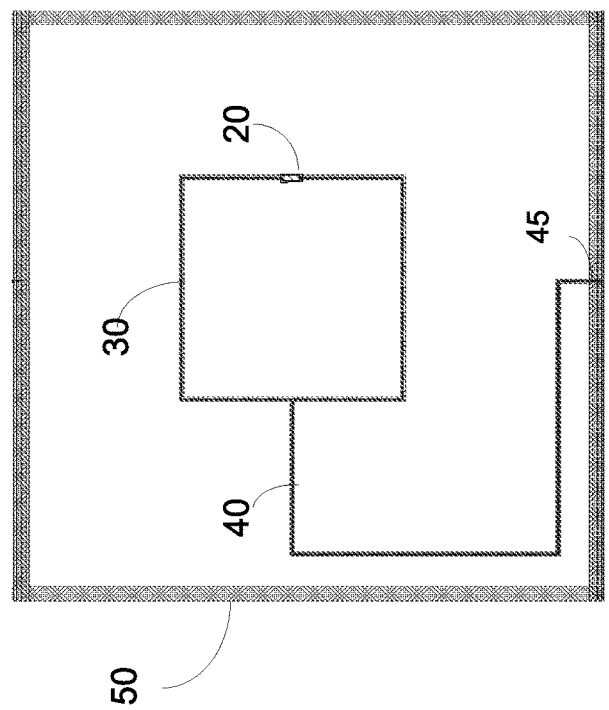
FIGS. 4 and 5 illustrate a pixel according to an embodiment of the invention.
Figure 5:
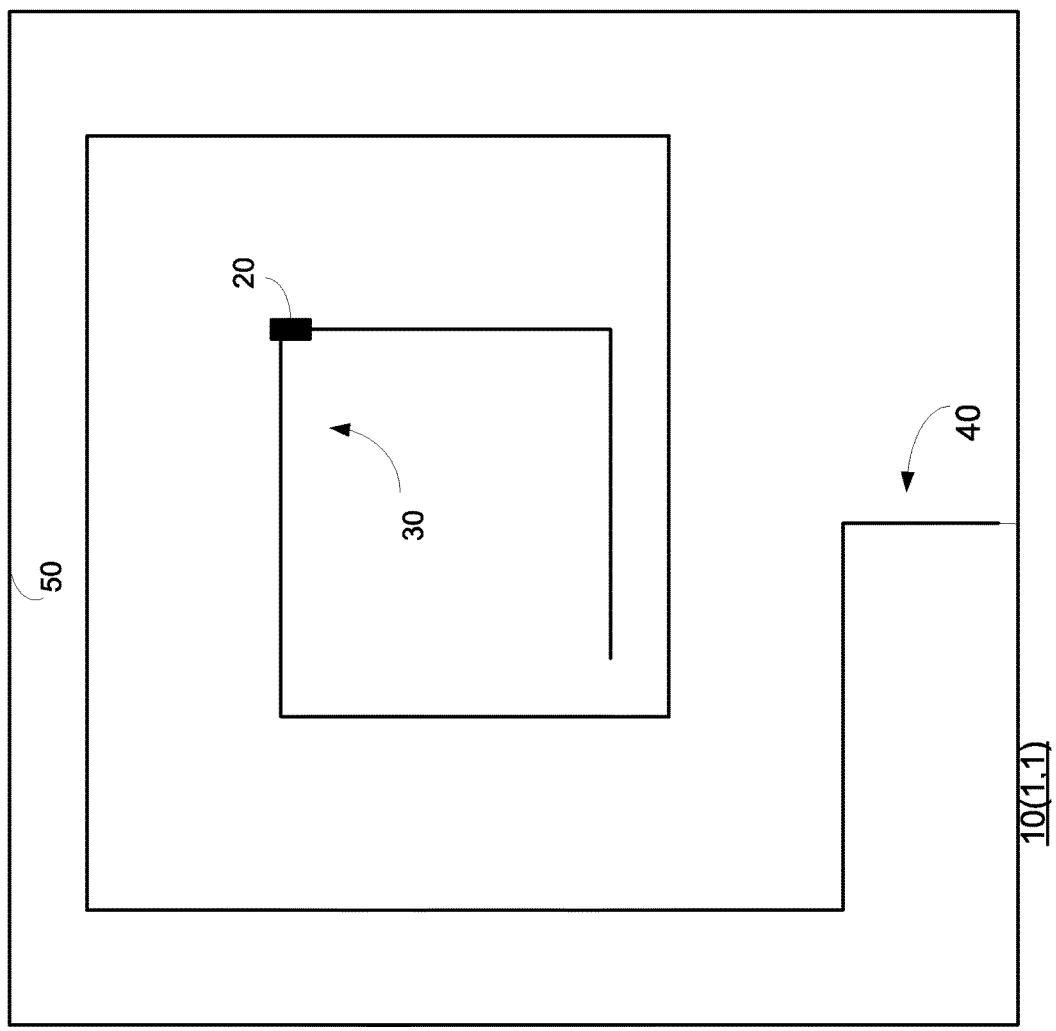

FIGS. 4 and 5 illustrate various pixels according to various embodiments of the invention. Each pixel includes the thermal antenna 30, the thermal sensor 20 and a holding element 40, which connects the suspended, micro or nano machined antenna integrated with the thermal sensor, to the frame 50 of the pixel. The cross section of the frame 50, thermal antenna 30 and the holding element 40 are shown in FIGS. 2A-2C.

According to an embodiment of the invention the thermal antenna is made of buried oxide as well as the ILD (Inter Level Dielectric) oxides and includes two conductors, which provide the contacts to the thermal sensor. These conductors are typically made of active silicon and polysilicon lines, because of thermal considerations discussed below.

The micro or nano-machined (released by dry etching processes) devices, which are suspended in vacuum, are held by a holding element such as a suspended beam, that may referred to as a "holding arm" 40. The holding arm 40 is connected to the frame 50 only at a single contact point 45, regardless of the exact shape of the holding arm (see FIGS. 1B and 4). This design feature may provide lower thermal conduction as well as higher mechanical robustness. The micro (or nano) machined thermal antennas and sensors are made of several different layers (crystalline silicon, polysilicon, inter-level dielectrics and more—see FIGS. 2A-2C and 3A-3D) and as a result, stress gradients are introduced during the CMOS fabrication. After the NEMS/MEMS post processing the cantilever design enables the stress to be relieved.

As commented in [13-14], choosing antenna shapes such as those of FIGS. 4 and 5 may seem to be clouded in mystery. A good starting point is to consider a straight dipole element of $\lambda_\varepsilon/2$ where $$\lambda_\varepsilon = \frac{\lambda}{\sqrt{\varepsilon}}$$

is the reduced wavelength in the dielectric. In the CMOS-SOI-MEMS technology under study, the cross-section of the FSS antenna is very thin compared to the wavelength, as shown in FIG. 2. Hence $\varepsilon \cong 1$ is assumed. When the dipole is $\lambda_\varepsilon/2$ long it will resonate and scatter effectively. However, the problem with this element is that the resonance may change considerably with angle of incidence as well as polarization. Reference [13] suggests several remedies to solve this, such as shortening the elements and loading them with a small inductance. Alternatively, loop elements are preferred for making high-quality FSS for different polarizations. All loop elements resonate when their average circumference is equal to 2, allowing for a relatively compact structure.

Accordingly, reference [12] presents an mm-wave FSS absorber based on a periodic array of resistive (made of Nichrome) rings fabricated on a grounded dielectric layer. Such arrays, optimized for maximum absorption at ~95 Hz, provide more than 99% absorption in a frequency band of few GHz. However, the design of [12] does not consider MEMS and the rings are located on a dielectric substrate. This approach significantly increases the thermal conductance and reduces the temperature increase as predicted by equation (8).

According to an embodiment of the invention the design of the pixels is more complicated since it takes into consideration two major issues, which are related: There is a crucial need to reduce significantly the thermal conductance as well as the thermal capacitance to optimize the performance of the thermal sensors, which are integrated on the thermal antennas. Since this is achieved by applying micromachining to the FSS antenna, holding arms are required for the suspended-in-vacuum FSS antennas. Thus, the perfect symmetry of an array of loops is disrupted by the holding arms, as shown in FIGS. 4 and 5. Furthermore, the computer aided design (CAD) of microelectronics prefers square structures to circular structures and therefore the loops are replaced by squares. The perimeter of the square is designed to be equal to the central wavelength of the THz radiation of interest.

Accordingly, the design of the holding arm becomes part of the design of the FSS thermal antennas. In fact, the thermal design considerations and the electromagnetic design are inseparable, which results in the evolution shown in FIGS. 4 and 5. We start with the design of FIG. 4, which is based on an array of closed-loops antennas with the necessary holding arms. We follow with the spiral antenna in FIG. 1B, where the thermal conductance is lower. Finally, we proceed to two spiral loops, as shown in FIG. 5, where the holding arm is also designed as an antenna for a slightly different wavelength, resulting is a broader band performance. The electromagnetic and thermal modeling discussed below illuminate these considerations.

In the following paragraphs it is assumed that minimal reflection and correspondingly maximal absorption is obtained when the overall resistance of the resistive FSS antennas is equal to $Z_0=377\Omega$, the impedance of free space. The achievement of impedance matching and maximum absorption, based on the FSS design in CMOS-SOI-MEMS technology, is discussed below.

Electromagnetic Modeling and Design

In CMOS-SOI technology, it is difficult to fabricate the thin $Z_0=377$ $\Omega/W$ conducting layer needed for a Salisbury screen (uniform sheet) absorber. Instead, an array of narrow parallel conductors with lower resistance may be used. But such a design absorbs only radiation whose electric field is parallel to the traces. In order to detect radiation of any polarization, one may use circular conducting loops, as proposed in [12-14]. For any polarization, two points on the loop will be tangent to the electric field and will form the center of semicircle-shaped absorbing antennas. The loop perimeter should equal the wavelength of radiation to be detected, namely $\lambda$. Thus, one can describe the loop as two antennas in parallel, and each antenna has a length of $\lambda/2$. The thermal sensor is placed somewhere along the perimeter of the loop; preferably, at a point where it is expected that the temperature rise will be highest. The resistance per square of the FSS structures must be appropriately chosen so that the overall (pixel) absorbing antenna structure resistance is ~377 ohms. If thin parallel conductive traces are used (each one acting as an $\lambda/2$ antenna), the trace resistance per square must be decreased from 377Ω in proportion to the trace aspect ratio. In the circular loop FSS of FIG. 4 there are effectively two antennas in parallel and the effective aspect ratio is λ/2 divided by twice the width of the loop trace. This issue is further discussed below.

In the CMOS-SOI technology under study, the available layers for impedance matching are polysilicon and silicon device layers, with ~8 Ω/W and ~6 Ω/W, respectively. To achieve 377Ω on a straight strip of active silicon, ~47 squares are required. However, to access the thermal sensor electrically, two conductors are required (see FIGS. 2A-2C). When these two conductors are located on the same strip, the equivalent resistance is approximately half the resistance of one conductor. Hence, the required number of squares is doubled if we ignore the small difference between R/W of polysilicon and active silicon.

Other conductive structures must be added to the loop to make it practical for use in a suspended detector array. A suspended "holding arm" must be used to physically link the suspended loops to the frame of the pixel. This arm should carry the conducting traces needed to electrically measure the sensor. The conductors on the holding arm and the antenna are made of active silicon and polysilicon in order to reduce the thermal mass and thermal conductivity. Additional low-impedance metallization lines must be run on the frame in the X and Y directions to allow for the measurement by the readout circuitry (ROIC) of any sensor in the array. These interconnects are known as the row line and the bit line, and are made of metal 1 and metal 2 (copper and aluminum). The cross sections of the antenna loop, holding arm and pixel frame are shown in FIGS. 2A-2C. FIG. 2C illustrates that the metallization lines (conductors 50(1) and 50(2)) on the frame 50 are DC separated from each other, since they are realized in different metallization levels of the CMOS-SOI process. However, since the inter level dielectric between the two levels is very thin compared to the wavelength, for the THz radiation under study they are in practice shorted. Hence, all the metallization lines and conducting lines determine the boundary conditions of the EM simulations discussed below and must be taken into consideration.

The resulting sensing device is called a "closed-loop thermal antenna". One pixel from this device is shown in FIG. 4. The outer square or "frame" 50 represents the traces in the X and Y directions. These traces do not form electric contact with each other at the pixel corners (the traces are on different metal layers). When many pixels are placed together in an array, these traces form a grid which physically supports the micro machined pixels as well as carrying the measurement signals and providing a heat-sink for each pixel. The antenna "loop" is the square at the center of FIG. 4. It is square rather than circular to ease fabrication, but it is expected that the electromagnetic performance will be little affected. The trace connecting the inner "loop" to the outer "frame" is called the "arm".

With this complex structure, voltages are induced in the arm and frame as well as in the loop, wherever a metal trace is parallel to the incident electric field. Instead of two antennas located on opposite sides of the loop, several antennas exist at various places in the structure, wherever current flows. The size and location of these antennas must be determined by simulations, and varies with radiation frequency and radiation polarization.

In addition to FIG. 4, two other pixel designs were created as shown in FIG. 5 and FIG. 1B. In these structures the "loop" does not form a complete loop, but instead has a gap in it. This change lowers thermal conductivity, since heat absorbed in the loop must travel a longer distance before being dissipated. The gap interferes with the two antennas which were expected to form in the loop, leading to a different antenna pattern with antennas likely being of different lengths than before. This was expected to reduce absorption, but the improved thermal properties were expected to make the change worthwhile. In the design of FIG. 5, additional segments are added to the arm, with the aim of increasing the number of antennas and increasing absorption.

Figure 6A:
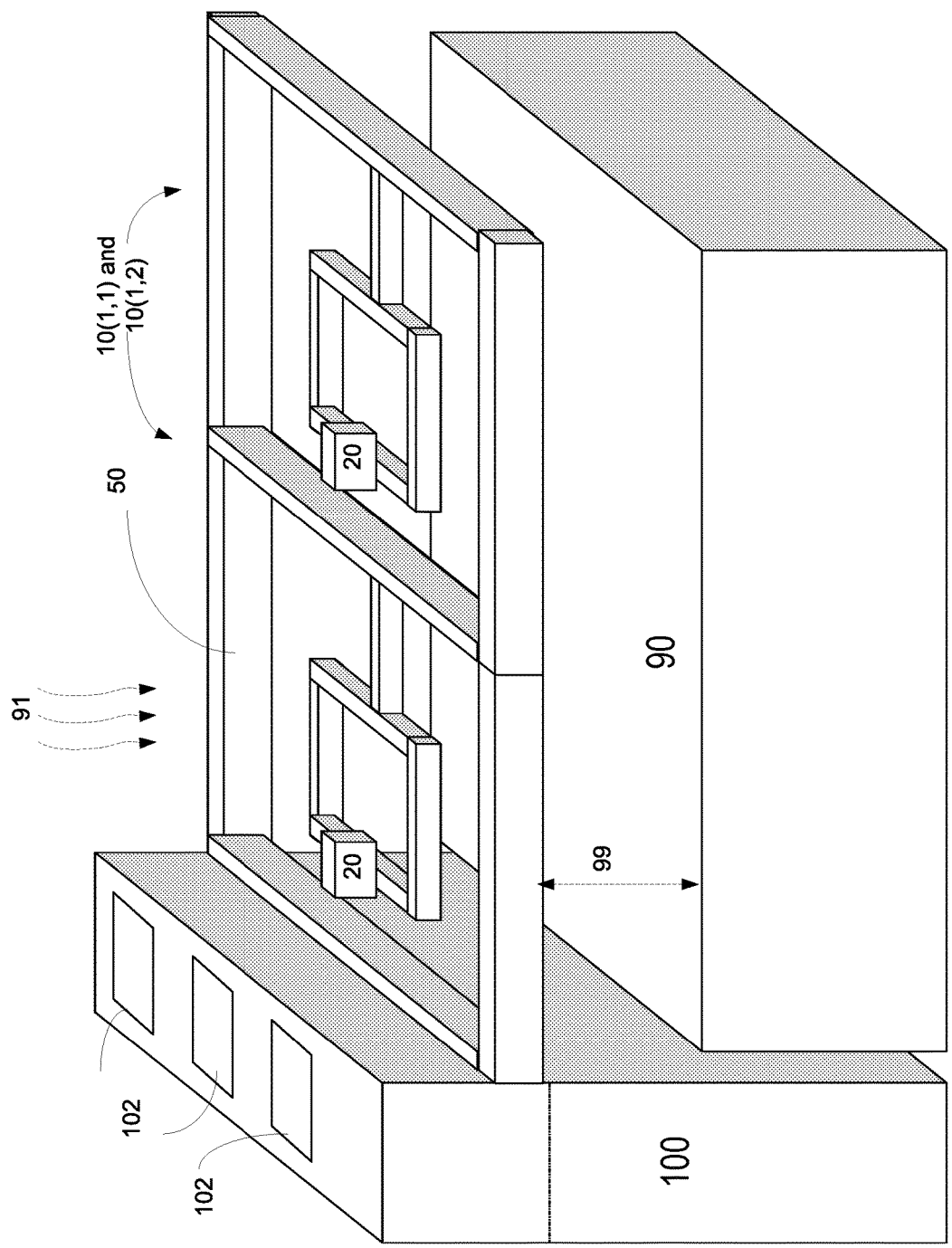
FIG. 6A illustrates two pixels of an array, bonding pads, a wafer handle and a reflector arranged to receive front side illumination according to an embodiment of the invention.
Figure 6B:
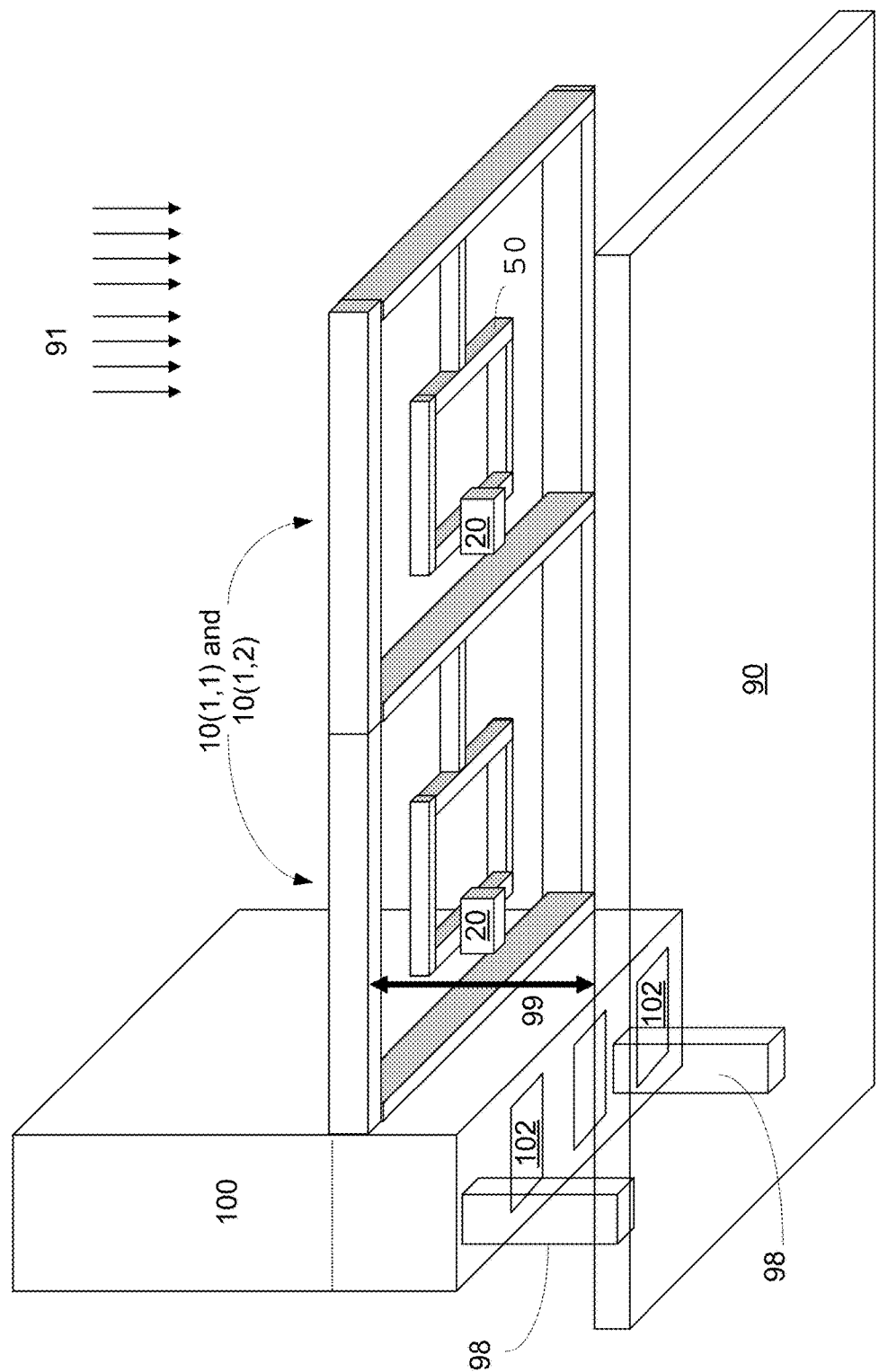
FIG. 6B illustrates two pixels of an array, bonding pads, a wafer handle and a reflector arranged to receive front side illumination according to an embodiment of the invention.

FIGS. 6A-6B illustrate two pixels 10(1,1) and 10(1,1) of array 10, a portion of frame 50, a reflector 90, a wafer handle 100 and bonding pads 102 according to different embodiments of the invention. FIG. 6A illustrates a front side illumination configuration (illumination arrives from above the array and the device layer and the thermal sensor is facing the radiation) in which the reflector 90 is positioned below the frame 50 and the pixels 10(1,1) and 10(1,2). FIG. 6B illustrates a back side illumination (illumination arrives from below the array and through the wafer and the thermal sensor is facing the reflector) in which the reflector 90 is positioned above the frame 50 and the pixels 10(1,1) and 10(1,2). In both FIGS. 6A and 6B the frame 50 is connected to the wafer handle 100 and the wafer handle 100 includes bonding pads 102 that allow electrical connectivity to the readout circuit (not shown), to the thermal sensor and the like. In both Figures the distance 99 between the pixels and the reflector 90 can be about one fourth of a wavelength—such as a central wavelength of a desired radiation region of operation. In FIG. 6A the left side of the reflector 90 is connected to the silicon handle 100 while in FIG. 6B the reflector 90 is connected by spacers 98 to the silicon handle 100.

Figure 7:
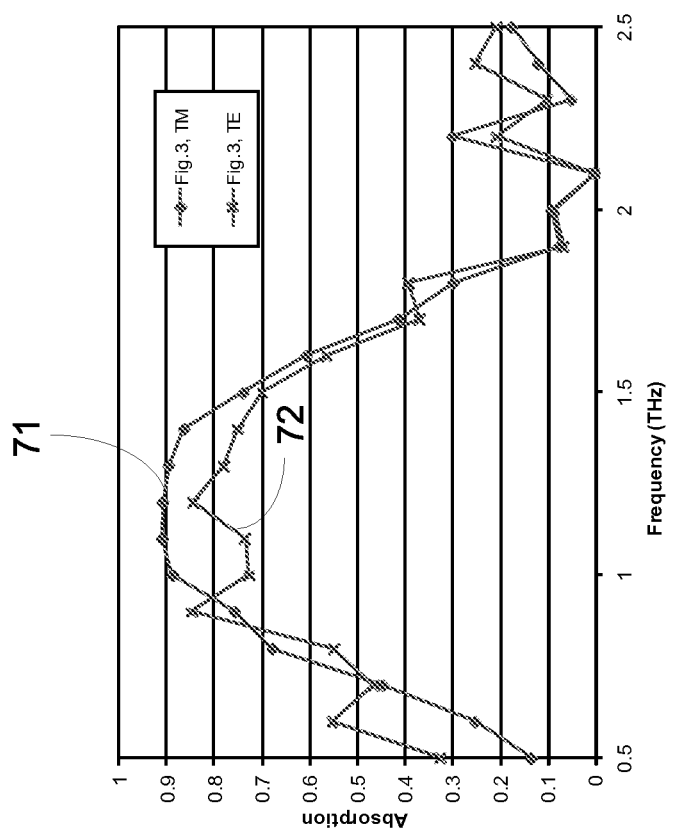
FIG. 7 illustrates an electromagnetic radiation absorption efficiency spectrum for a closed-loop antenna of FIG. 4 according to an embodiment of the invention.
Figure 8:
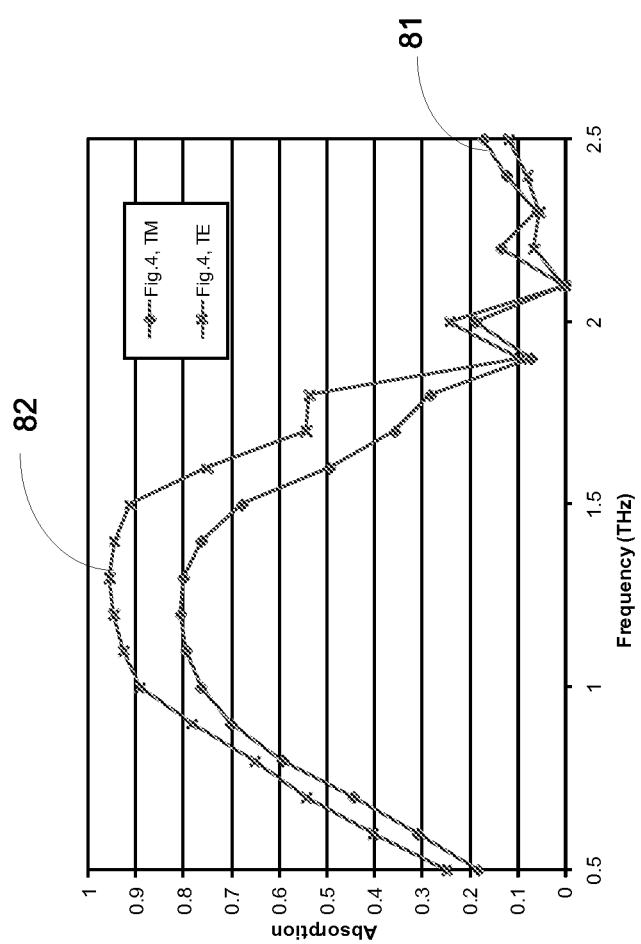
FIG. 8 illustrates an electromagnetic radiation absorption efficiency spectrum for a spiral thermal antenna of FIG. 5 according to an embodiment of the invention.
Figure 9:
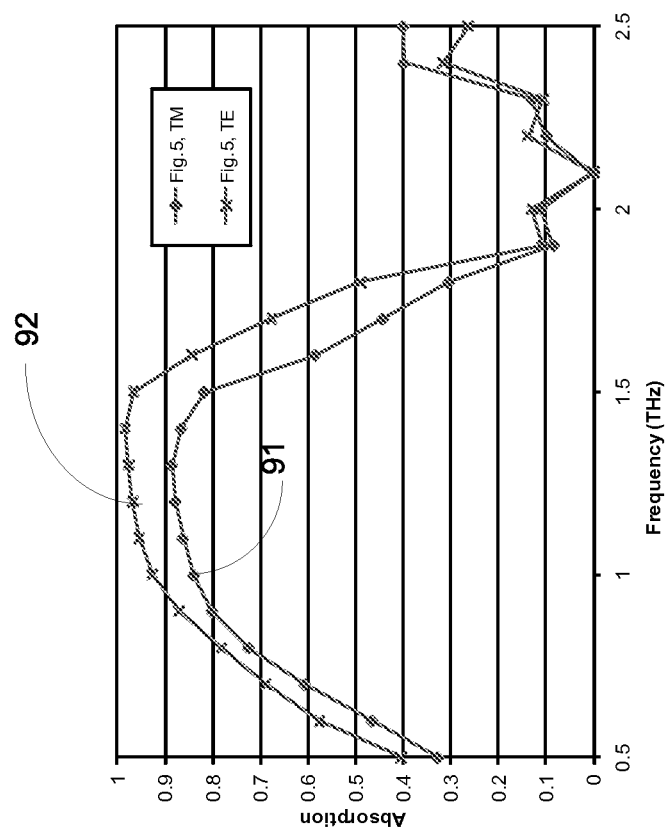
FIG. 9 illustrates an electromagnetic radiation absorption efficiency spectrum for spiral thermal antenna with two loops of FIG. 6 according to an embodiment of the invention.

Electromagnetic properties of the array of pixels shown in FIGS. 1B, 4 and 5 were verified using the Ansoft HFSS electromagnetic simulator [23]. A single pixel of the array was constructed in the simulator, with periodic boundary conditions set to model an infinite array of cells. A vertically incident plane wave was provided to the pixel. Two radiation modes (polarizations) were simulated for each structure: one in which the electric field was in the vertical direction (represented by graphs 71, 81 and 91 in FIGS. 7-9), and one in which the electric field was in the horizontal direction (represented by graphs 72, 82 and 92 in FIGS. 7-9).

Radiation absorption takes place to different degrees in each conductive structure (loop, arm, and frame), but it is desired that most absorption occur in the antenna, near the sensor. The frame consists of very good conductors (R/W=0.12Ω). The power absorbed in a conductor, modeled as a two-dimensional sheet, is $$P = \int_A J^2_{surface} R_\square \, dA \tag{9}$$

Simulations showed that the induced current in the frame is less than in the arm and antenna. Since the resistance per square is more than an order of magnitude lower in the frame, it is clear that only a small fraction of absorption will occur in the frame.

Absorption in the arm, on the other hand, can be significant. The traces on the arm are made of a relatively high-resistivity material with resistance per square similar to the antenna traces. Thus, a significant amount of absorption could be expected to occur in the arm as well as in the loop. Absorbed thermal energy would be conducted along the arm until reaching the frame, which due to its high conductivity is regarded as a heat sink. Energy absorbed in the arm would be dissipated more quickly and thus cause less measurable temperature difference. Thus, it is desired that as much absorption as possible takes place in the antenna rather than the arm. To minimize absorption in the arm, in the sensor of FIG. 1B the arm skirts the edge of the cell, as close as possible (10 μm; narrower gaps might cause fabrication problems) to the frame. The assumption is that the frame functions as a short circuit, forcing the electric field to go to zero near it. Far from the frame, where the loop is located, the electric field should be high and most of the absorption should occur. Simulations verified that this absorption was also a high percentage of the overall incident radiating energy. Furthermore, the arm is designed to be as straight as possible to reduce EM power absorption in the perpendicular mode.

Thermal Modeling

From a thermal perspective, the suspended pixel of FIGS. 1B, 4 and 5 consists of two main parts: the antenna, whose impedance is electromagnetically matched to the free space incoming THz radiation; and the holding arm, which is supposed to absorb little energy compared to the antenna. The third part—the thermal sensor—is ignored in the modeling below, since its dimensions and heat capacitance are very small compared to the two main parts discussed above. The antenna has a spiral or loop shape, but since it is assumed that heat flows along the antenna length by conduction only, it may be treated from a thermal perspective like a straight line (FIG. 10A). The antenna can be approximated by the 1D heat flow equation, since the antenna width and height (1.65 μm and 1.42 μm, respectively) are very small compared to its length (several hundred microns).

FIG. 10A illustrate a straight line 1111 that is parallel to the x-axis and represents the heat flux (W/m^2)—having a direction from the hotter part towards the heat sink. That is, from a loop shaped thermal antenna which is assumed to be uniformly heated, through the holding element (assuming that inside the holding element there's no heat power generated). The points on x-axis are:

a. Point 0: The tip of the loop.
b. Point L1: an end of the heated part (loop) and the start of the unheated holding element.
c. Point L: connection between holding element and frame.

The 1-D heat flow equation reads:

$$\frac{\partial T}{\partial t} = \alpha \frac{\partial^2 T}{\partial x^2} + \frac{P\%}{C\%} \quad (10)$$

$$\tilde{P}(x,t) = \tilde{P}_1 + \tilde{P}_2, \quad (11\text{-}13)$$

$$\tilde{P}_1 = P_0 u(t)[u(x) - u(x - L_1)],$$

$$\tilde{P}_2 = \frac{I_0 R^2}{L} u(t - t_0)$$

$\tilde{P}_1$ corresponds to the absorbed EM power, $P_{total} = P_0 L_1$ (14) is the total available EM power, and $\tilde{P}_2$ is due to the current, which is applied to the device only during the measurement cycle $t_0 \le t \le T$ out of the total period time T.

Boundary conditions are isolated antenna end $$\left.\frac{\partial T}{\partial x}\right|_{x=0} = 0 \quad (15)$$

and ambient constant temperature at the arm connection with the frame $$T(x=L,t)=T_0. \quad (16)$$

The initial condition for each measurement is assumed to be $$T(x,t=0)=T_0 \quad (17)$$

We use a change of variable, from T to ΔT, to simplify the notation, to find the temperature change relative to the reference ambient temperature $T_0$ $$\Delta T(x,t)=T(x,t)-T_0(x) \quad (18)$$

Analytical Modeling of Thermal Parameters
Thermal Conductance Analytical Modeling.

The superposition principle is used to calculate separately the rise in the temperature caused by each of the sources. Solving Eq. (4) for the EM power source, $\tilde{P}_1$, in the steady state, the change in the temperature at steady state, $\Delta T_{SS}$, is obtained:

$$\Delta T_{ss,1} = \quad (19)$$

$$\Delta T(x, t \to \infty) = \frac{P_0}{2\tilde{K}}[(L^2 - x^2)u(x) - (L - L_1)^2 + (x - L_1)^2 u(x - L_1)]$$

$$\Delta T_{ss,1} = \Delta T(0, t \to \infty) = \quad (20)$$

$$\frac{P_0 L_1}{\tilde{K}}\left(L - \frac{L_1}{2}\right) = P_{total}\left(\frac{L_{arm}}{\tilde{K}} + \frac{L_{loop}}{2\tilde{K}}\right) = P_{total}(R_{arm} + R_{loop}),$$

where $R_{arm} = \frac{L_{arm}}{\tilde{K}}$ and $R_{loop} = \frac{L_{loop}}{\tilde{K}}$ denote thermal resistors.

Here $\tilde{K}=A_{ps}\cdot k_{ps}+A_{as}\cdot k_{as}+A_{ox}\cdot k_{ox}$ is the thermal antenna heat conductance per unit length, where $A_{ps}$, $A_{as}$ and $A_{ox}$ are the cross section area of polysilicon, active silicon and stacked oxides, respectively.

For maximum sensitivity and a given absorbed power, both thermal resistances should be as large as possible. However, the influence of the arm thermal resistor is twice as large as the influence of the antenna thermal resistance.

Thermal Time Constant Analytical Modeling—Transient Response

The transient temperature response is $$\Delta T_{tr,1}(x,t) = \sum_{m=0}^{\infty} B_{2m+1}\tau_{2m+1}(1 - e^{-t/\tau_{2m+1}})\cos\left(\frac{\pi}{2L}(2m+1)x\right)u(t), \quad (21)$$

$$\tau_{2m+1} = \frac{1}{\alpha\left(\frac{\pi}{2L}(2m+1)\right)^2} \quad (21\text{-}23)$$

$$B_{2m+1} = \frac{P_0}{\tilde{C}}\frac{4}{\pi(2m+1)}\sin\left(\frac{\pi(2m+1)L_1}{2L}\right)$$

The thermal time constant for the sensing device positioned at $x=L_S$ is given by $$\tau = \tau_1\left(1 - \ln\left(\frac{\Delta T_{ss}}{\gamma_0}\right)\right), \quad (24)$$

where $\gamma_m = \beta_{2m+1}\tau_{2m+1}\cos\left(\frac{\pi}{2L}(2m+1)L_s\right)$. \quad (25)

Validation of the Model Via Simulations Using COMSOL
Defining thermal conductance as $$G_{th} = \frac{P_{total}}{\Delta T_{ss}} \quad (26)$$

and the thermal time constant τ by (see also Eq. (18))

$$\Delta T_{tr,1}(x=L_S, t=\tau) = \Delta T_{SS}(1-e^{-1}), \quad (27)$$

we further validate the analytically calculated τ (Equations 23-24) and $G_{th}$ (Eqs. 25 and 20) via numerical simulations in Comsol [24].

Based on the physical cross section of the spiral antenna (see FIG. 2A), its thermal properties per length (conductance $\tilde{K}$, capacitance $\tilde{C}_t$, and diffusivity coefficient α) can be expressed as three conductors in parallel, resulting in:

$$\tilde{K} = 4.58 \cdot 10^{-12} \text{ [W·m/K]} \quad (28)$$

$$\tilde{C}_t = 3.72 \cdot 10^{-6} \text{ [J/(K·m)]} \quad (29)$$

$$\alpha = \tilde{K}/\tilde{C}_t \quad (30)$$

Figure 10B:
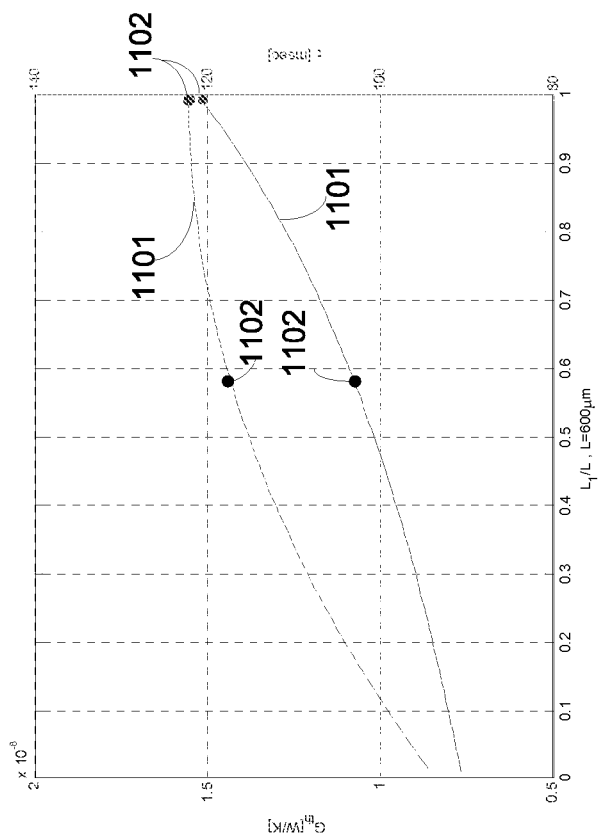
FIG. 10A illustrates the 1D thermal model and FIG. 10B illustrates analytically calculated (solid lines) and simulated (red points) thermal conductance of the holding arm Gth and a thermal time constant r according to an embodiment of the invention.
Figure 10A:
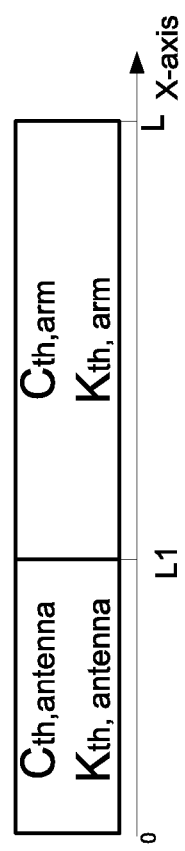

FIG. 10 demonstrates the time constant, τ, and $G_{th}$ dependence on effective antenna length $L_1$. The blue line shows analytically calculated dependence of $G_{th}$ on the length of the arm. The green line shows analytically calculated dependence of τ on the length of the arm. The red dots are simulation results, obtained using Finite Element Modeling solution of the above heat transfer equation. As can be seen from the graphs the analytical model is accurate and correlates τ, and $G_{th}$ calculated via simulations with error less than 1%

Figure 11:
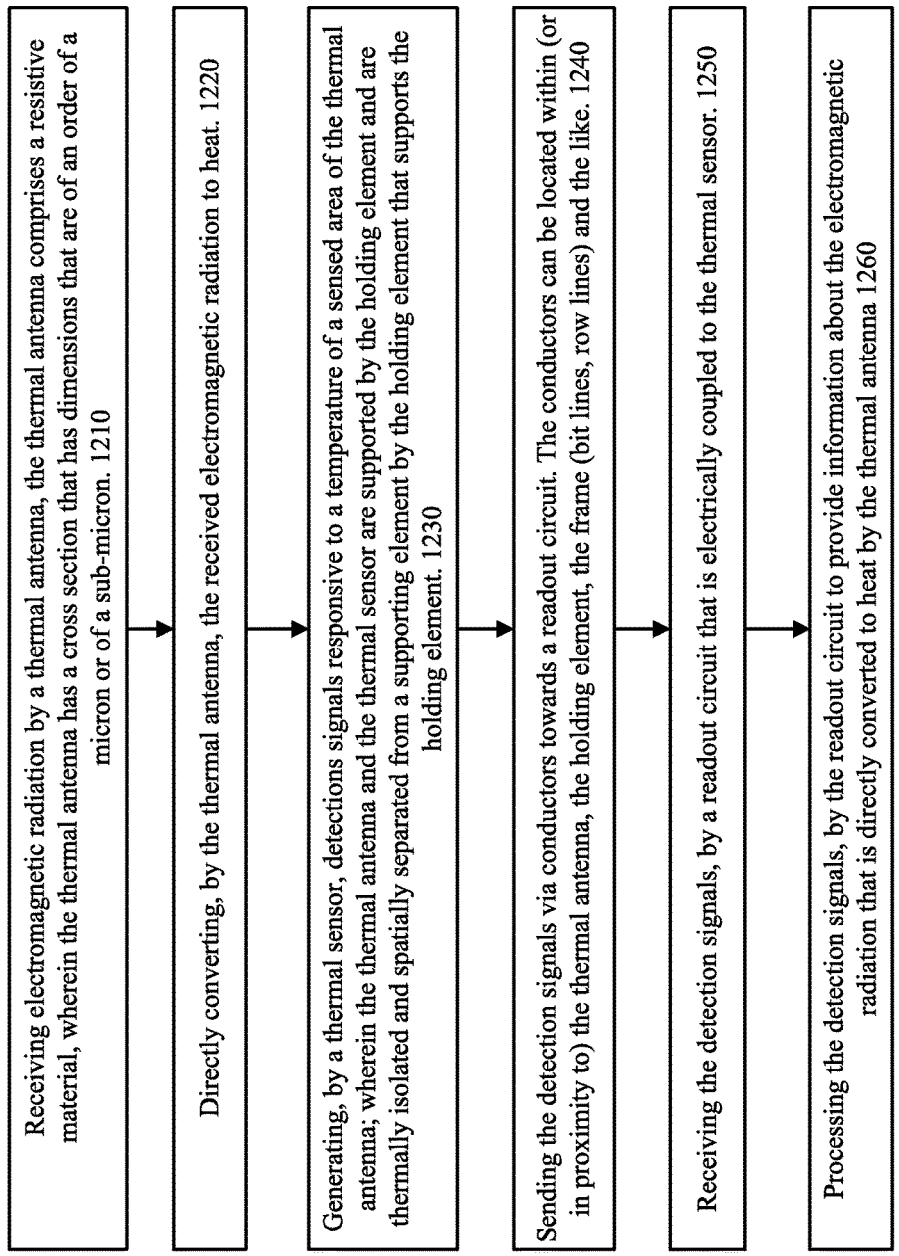
FIG. 11 illustrates a method for sensing electromagnetic radiation according to an embodiment of the invention.

FIG. 11 illustrates a method 1200 for sensing electromagnetic radiation according to an embodiment of the invention.

Method 1200 may include at least some of the following stages:
  a. Stage 1210 of receiving electromagnetic radiation by a thermal antenna, the thermal antenna comprises a resistive material, wherein the thermal antenna has a cross section that has dimensions that are of an order of a micron or of a sub-micron.
  b. Stage 1220 of directly converting, by the thermal antenna, the received electromagnetic radiation to heat.
  c. Stage 1230 of generating, by a thermal sensor, detections signals responsive to a temperature of a sensed area of the thermal antenna; wherein the thermal antenna and the thermal sensor are supported by the holding element and are thermally isolated and spatially separated from a supporting element by the holding element that supports the holding element.
  d. Stage 1240 of sending the detection signals via conductors towards a readout circuit. The conductors can be located within (or in proximity to) the thermal antenna, the holding element, the frame (bit lines, row lines) and the like.
  e. Stage 1250 of receiving the detection signals, by a readout circuit that is electrically coupled to the thermal sensor.
  f. Stage 1260 of processing the detection signals, by the readout circuit to provide information about the electromagnetic radiation that is directly converted to heat by the thermal antenna.

Method 1200 can be applied over one or more electromagnetic frequency ranges. Thus, stage 1220 may include converting to heat, by direct conversion (hereinafter—directly converting), by the thermal antenna, infrared radiation, terahertz radiation, radio frequency radiation, Millimetric radiation or a combination thereof to heat.

The thermal antenna may be configured so that heat developed in the thermal antenna as a result of a direct conversion of the electromagnetic radiation to heat exceeds by magnitude a heat developed in the thermal antenna as a result of a flow of an electrical current developed in the thermal antenna as a result of the electromagnetic radiation.

Method 1200 can be executed by any of the mentioned above sensing devices or portions of such sensing devices. Thus, method 1200 may be executed by a sensing device that exhibits at least one of the following:

The thermal antenna is bigger than thermal sensor.
  The thermal antenna is at least four times bigger than thermal sensor.
  The spatial separation between the supporting element and each of thermal antenna and thermal sensor is obtained by utilizing a Micro Electro Mechanical System (MEMS) micro-machined process.
  The spatial separation between the supporting element and each of thermal antenna and thermal sensor is obtained by utilizing a Nano Electro Mechanical System (NEMS) nano-machined process.
  The thermal sensor is a diode.
  The thermal sensor is a transistor.
  The transistor is a Metal Oxide Semiconductor (MOS) transistor and the MOS transistor is arranged to operate, when generating the detection signals, at a sub-threshold region.
  The transistor is a Metal Oxide Semiconductor (MOS) transistor and the MOS transistor is arranged to operate, when generating the detection signals, outside a sub-threshold region.
  The drain and gate terminals of the MOS transistor are connected to one interconnect; and wherein bulk and source terminals of the MOS transistor are connected to another interconnect.
  The supporting element is formed on an oxide layer.
  The supporting element is formed on an oxide layer and the readout circuit is a Complementary Metal Oxide Semiconductor (CMOS) readout circuit.
  The supporting element includes an oxide layer.
  The supporting element includes a silicon germanium layer.
  The sensing device includes an electromagnetic reflector that is spaced apart from thermal antenna.
  The sensing device includes a reflector that is spaced apart from thermal antenna by one fourth of an electromagnetic radiation wavelength of interest.
  The sensing device includes a reflector that is spaced apart from thermal antenna, wherein thermal sensor faces the reflector.
  The sensing device includes a reflector that is spaced apart from thermal antenna and is positioned as a certain direction in relation to thermal antenna, wherein thermal antenna is directed at a direction that is opposite to the certain direction.
  The thermal antenna is connected to the holding element at a single contact point.
  The sensed area is distant from the single contact point between the holding element and the thermal antenna.
  The sensed area is proximate to the single contact point between the holding element and the thermal antenna.
  The holding element can be connected to the supporting element as a single contact point.
  The thermal antenna is shaped as a loop and wherein the sensed area and the single contact point are located at opposite sides of the loop.

The sensing device includes multiple pixels; wherein each pixel comprises a thermal antenna, a thermal sensor and a holding element.

The multiple pixels are arranged to form a frequency selective surface (FSS) array.

The sensing element may include a reflector that is spaced apart from thermal antenna.

The multiple pixels are coupled to the readout circuit by row lines and bit lines.

The row lines and the bit lines belong to different metal layers of the sensing device.

The row lines and the bit lines are arranged to absorb heat generated by holding elements of the pixels.

At least one segment of the holding element of each pixel is proximate to a line selected of a row line and a bit line such that the line virtually short circuits the at least one segment of the holding element.

The row lines and the bit lines form a part of the supporting element.

The row lines and the bit lines are supported by the supporting element.

The holding element is connected to the frame at multiple contact points.

The sensed area may be an area of thermal antenna that is expected to be a hottest area of thermal antenna.

The sensed area is proximate to an area of thermal antenna that is expected to be a hottest area of thermal antenna.

The sensed area differs from an area of thermal antenna that is expected to be a hottest area of thermal antenna.

The length of thermal antenna is not smaller than a central wavelength of a frequency range of interest.

The length of thermal antenna substantially equals a central wavelength of a frequency range of interest.

The thermal antenna has impedance that is electromagnetically matched to the intrinsic impedance of free space electromagnetic radiation.

The thermal antenna consists of CMOS manufactured structural elements that are manufactured by a CMOS manufacturing process, and wherein the CMOS manufactured structural elements are sized and shaped to provide thermal antenna with impedance that is electromagnetically matched to a free space electromagnetic radiation.

The thermal antenna is arranged to absorb more thermal energy than the supporting element.

The thermal antenna is integrated with thermal sensor.

The thermal antenna comprises multiple antenna segments; wherein adjacent antenna segments are substantially normal to each other.

The thermal antenna is shaped as a closed circular loop.

The thermal antenna is shaped as an open circular loop.

The thermal antenna is shaped as a closed non-circular loop.

The thermal antenna is shaped as an open non-circular loop.

The thermal antenna has a spiral shape.

The thermal antenna comprises multiple loops.

The thermal antenna includes multiple loops; wherein the multiple loops comprise a first loop for receiving radiation at a first frequency range and a second loop for receiving radiation at a second frequency range that differs from the first frequency range.

The thermal antenna is shaped as a loop for receiving radiation at a first frequency range and wherein the holding element is shaped as a second loop for receiving radiation at a second frequency range that differs from the first frequency range.

The thermal antenna comprises multiple loops and wherein thermal sensor is located in proximity to an edge of one of the multiple loops.

The thermal sensor is manufactured by a Complementary Metal Oxide Semiconductor (CMOS) process.

The thermal sensor is manufactured by a bipolar process.

The thermal sensor is manufactured by a Complementary Metal Oxide Semiconductor silicon On Oxide (CMOS-SOI) process.

The thermal sensor comprises silicon germanium.

The thermal sensor is a lateral diode.

The thermal sensor is a bolometer.

FIG. 12 is a cross sectional view of a portion 1300 of a sensing device according to an embodiment of the invention. The cross sectional view illustrates a cross section of a die such as those illustrated in FIG. 3D. FIG. 12 also illustrates the silicon handle 360(1) can be a part of a silicon substrate and that another part 360(2) of the silicon substrate may support a readout circuit 1302. The readout circuit 1302 and any other digital or analog circuit can be formed on the same layers as the pixel and the array of pixels.

It is noted that the sensing device can include one or more pixels, can include readout circuits, and the like. The sensing device can be a camera, can include a camera and the like.

FIG. 13 illustrates a portion of a sensing device 1390 according to an embodiment of the invention.

FIG. 13 illustrates the sensing device 1390 as including a die 12 that includes analog components such as array 10, readout circuit 1302, de-multiplexer 1304 and multiplexer 1310. Die 12 includes an area 11 that is etched to remove the silicon substrate—as illustrated in FIGS. 3A-3D.

The sensing device 1390 also includes digital components such as digital controller 1308 and bias circuit 1310. It is noted that die 12 can include digital components and that one or more dies can include one or more of the components of FIG. 13. The connecting pads 102 of FIGS. 6A and 6B can be used to convey signals between die 12 and other dies, but this is not necessarily so.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A sensing device, comprising:
   a thermal antenna that comprises a resistive material, wherein the thermal antenna has at least one cross section that has dimensions that are of an order of a micron or of a sub-micron, wherein the thermal antenna is arranged to receive electromagnetic radiation and to directly convert the electromagnetic radiation to heat; wherein the thermal antenna is shaped as a first loop and is arranged to act as a band pass filter for at least one frequency range out of infrared frequency range and terahertz frequency range;
   a supporting element arranged to support a holding element;
   a thermal sensor arranged to generate detection signals responsive to a temperature of a sensed area of the thermal antenna;
   wherein the holding element is shaped as a second loop for receiving radiation at a second frequency range that differs from the at least one frequency range out of the infrared frequency range and the terahertz frequency range;

wherein the holding element is arranged to:
support the thermal antenna and the thermal sensor; and
thermally isolate the thermal antenna and the thermal sensor from the supporting element; and
a readout circuit that is electrically coupled to the thermal sensor, the readout circuit is arranged to receive the detection signals and to process the detection signals to provide information about the electromagnetic radiation that is directly converted to heat by the thermal antenna; and
wherein the thermal sensor and the thermal antenna are spatially separated from the supporting element.

2. The sensing device according to claim 1, wherein the thermal antenna is configured so that heat developed in the thermal antenna as a result of a direct conversion of the electromagnetic radiation to heat exceeds by magnitude a heat developed in the thermal antenna as a result of a flow of an electrical current developed in the thermal antenna as a result of the electromagnetic radiation.

3. The sensing device according to claim 1, wherein the thermal antenna is arranged to convert infrared radiation within the infrared frequency range to heat.

4. The sensing device according to claim 1, wherein the thermal antenna is arranged to convert terahertz radiation within the terahertz frequency range to heat.

5. The sensing device according to claim 1, wherein the thermal antenna is arranged to act as a band pass filter for the infrared frequency range and for the terahertz frequency range.

6. The sensing device according to claim 1, wherein the thermal antenna is bigger than the thermal sensor.

7. The sensing device according to claim 1, wherein the thermal antenna is at least four times bigger than the thermal sensor.

8. The sensing device according to claim 1, wherein a spatial separation between the supporting element and each of the thermal antenna and the thermal sensor is obtained by utilizing a Micro Electro Mechanical System (MEMS) micro-machined process.

9. The sensing device according to claim 1, wherein a spatial separation between the supporting element and each of the thermal antenna and the thermal sensor is obtained by utilizing a Nano Electro Mechanical System (NEMS) nano-machined process.

10. The sensing device according to claim 1, wherein the thermal sensor is a diode.

11. The sensing device according to claim 1, wherein the thermal sensor is a transistor.

12. The sensing device according to claim 11, wherein the transistor is a Metal Oxide Semiconductor (MOS) transistor and the MOS transistor is arranged to operate, when generating the detection signals, at a sub-threshold region.

13. The sensing device according to claim 11, wherein the transistor is a Metal Oxide Semiconductor (MOS) transistor and the MOS transistor is arranged to operate, when generating the detection signals, outside a sub-threshold region.

14. The sensing device according to claim 11, wherein drain and gate terminals of the MOS transistor are connected to one interconnect; and wherein bulk and source terminals of the MOS transistor are connected to another interconnect.

15. The sensing device according to claim 1, wherein the supporting element is formed on an oxide layer.

16. The sensing device according to claim 1, wherein the supporting element is formed on an oxide layer and the readout circuit is a Complementary Metal Oxide Semiconductor (CMOS) readout circuit.

17. The sensing device according to claim 1, wherein the supporting element comprises an oxide layer.

18. The sensing device according to claim 1, wherein the supporting element comprises a silicon germanium layer.

19. The sensing device according to claim 1, further comprising an electromagnetic reflector that is spaced apart from the thermal antenna.

20. The sensing device according to claim 1, further comprising a reflector that is spaced apart from the thermal antenna by one fourth of an electromagnetic radiation wavelength of interest.

21. The sensing device according to claim 1, further comprising a reflector that is spaced apart from the thermal antenna, wherein the thermal antenna faces the reflector.

22. The sensing device according to claim 1, further comprising a reflector that is spaced apart from the thermal antenna and is positioned as a certain direction in relation to the thermal antenna, wherein the thermal antenna is directed at a direction that is opposite to the certain direction.

23. The sensing device according to claim 1, wherein the supporting element is connected to the holding element at a single contact point.

24. The sensing device according to claim 1, wherein the sensed area is distant from a contact point between the thermal antenna and the holding element.

25. The sensing device according to claim 1, wherein the sensed area is proximate to a contact point between the thermal antenna and the holding element.

26. The sensing device according to claim 1, wherein the sensed area and a contact point between the thermal antenna and the holding element are located at opposite sides of the loop.

27. The sensing device according to claim 1, comprising multiple pixels; wherein each pixel comprises a thermal antenna, a thermal sensor and a holding element; wherein the multiple pixels are arranged to form a frequency selective surface (FSS) array.

28. The sensing device according to claim 27, wherein the multiple pixels are backed by a fourth quarter wavelength grounded conducting reflector.

29. The sensing device according to claim 28 wherein an impedance of the thermal antenna is 377 Ohms.

30. The sensing device according to claim 27, wherein the multiple pixels are coupled to the readout circuit by row lines and bit lines; wherein at least one segment of the holding element of each pixel is proximate to a line selected of a row line and a bit line such that the line virtually short circuits the electromagnetic radiation absorbed at least in one segment of the holding element.

31. The sensing device according to claim 1, wherein the thermal antenna comprises multiple loops.

32. The sensing device according to claim 1, wherein the entirety of the thermal antenna is configured to receive the electromagnetic radiation.

33. The sensing device according to claim 1, comprising multiple pixels; wherein each pixel comprises a thermal antenna, a thermal sensor and a holding element.

34. The sensing device according to claim 1, wherein the thermal antenna comprises multiple segments; wherein all segments of the thermal antenna are connected to each other.

35. The sensing device according to claim 1, wherein the thermal antenna comprises multiple segments; wherein all segments of the thermal antenna are positioned at a same plane.

36. A method for sensing electromagnetic radiation, the method comprises:

supporting a thermal antennal and a thermal sensor by a holding element;

thermally isolating, by the holding element the thermal antenna and the thermal sensor from a supporting element;

receiving the electromagnetic radiation by the thermal antenna, the thermal antenna comprises a resistive material, wherein the thermal antenna has a cross section that has dimensions that are of an order of a micron or of a sub-micron; wherein the thermal antenna is shaped as a first loop and is arranged to act as a band pass filter for at least one frequency range out of infrared frequency range and terahertz frequency range;

directly converting, by the thermal antenna, the received electromagnetic radiation to heat;

generating, by the thermal sensor; detection signals responsive to a temperature, of a sensed area of the thermal antenna;

receiving the detection signals by a readout circuit: wherein the readout circuit is electrically coupled to the thermal sensor, and processing, by the readout circuit, the detection signals to provide information about the electromagnetic radiation that is directly converted to heat by the thermal antenna;

wherein the thermal sensor and the thermal antenna are spatially separated from the supporting element; and wherein the holding element is shaped as a second loop for receiving radiation at a second frequency range that differs from the at least one frequency range out of the infrared frequency range and the terahertz frequency range.

* * * * *